United States Patent
Geng et al.

(10) Patent No.: US 11,099,412 B2
(45) Date of Patent: Aug. 24, 2021

(54) OPTICAL WAVEGUIDE BEAM SPLITTER WITH PLURAL PARTIAL EXTRACTION FEATURES FOR DISPLAY

(71) Applicant: Facebook Technologies, LLC, Menlo Park, CA (US)

(72) Inventors: Ying Geng, Bellevue, WA (US); Jacques Gollier, Sammamish, WA (US); Babak Amirsolaimani, Redmond, WA (US); Fenglin Peng, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/862,401

(22) Filed: Apr. 29, 2020

(65) Prior Publication Data

US 2020/0371388 A1    Nov. 26, 2020

Related U.S. Application Data

(60) Provisional application No. 62/850,521, filed on May 20, 2019.

(51) Int. Cl.
*G02F 1/13* (2006.01)
*G02B 6/10* (2006.01)
(Continued)

(52) U.S. Cl.
CPC ......... *G02F 1/1326* (2013.01); *G02B 5/3025* (2013.01); *G02B 6/0025* (2013.01);
(Continued)

(58) Field of Classification Search
CPC ... G02F 1/1326; G02B 6/0025; G02B 6/0028; G02B 6/0031; G02B 6/0056;
(Continued)

(56) References Cited

U.S. PATENT DOCUMENTS 6,104,454 A    8/2000 Hiyama et al.
6,829,095 B2   12/2004 Amitai
(Continued)

FOREIGN PATENT DOCUMENTS

EP          1358765 A1    11/2003
WO    WO2007/062098 A2    5/2007
(Continued)

OTHER PUBLICATIONS

Facebook Technologies, LLC, Invitation to Pay Additional Fees, PCT/US2020/033688, dated Sep. 8, 2020, 16 pgs.
(Continued)

*Primary Examiner* — Andrew Jordan
(74) *Attorney, Agent, or Firm* — Morgan, Lewis & Bockius LLP

(57) ABSTRACT

An optical device includes a spatial light modulator and an optical waveguide with a plurality of extraction features. The plurality of extraction features is positioned relative to the optical waveguide so that a respective extraction feature receives light, having propagated within the optical waveguide, in a first direction and directs a first portion of the light in a second direction distinct from the first direction to exit the optical waveguide and illuminate at least a portion of the spatial light modulator. The plurality of extraction features is also positioned relative to the optical waveguide so that a respective extraction feature directs a second portion, distinct from the first portion, of the light to undergo total internal reflection, thereby continuing to propagate within the optical waveguide.

20 Claims, 21 Drawing Sheets

(51) Int. Cl.
  *G02B 5/30* (2006.01)
  *G02B 27/01* (2006.01)
  *F21V 8/00* (2006.01)
  *G02B 6/12* (2006.01)

(52) U.S. Cl.
  CPC ......... *G02B 6/0028* (2013.01); *G02B 6/0031* (2013.01); *G02B 6/0056* (2013.01); *G02B 6/105* (2013.01); *G02B 27/0172* (2013.01); *G02B 2006/12116* (2013.01); *G02B 2027/0178* (2013.01)

(58) Field of Classification Search
  CPC .. G02B 6/105; G02B 5/3025; G02B 27/0172; G02B 27/0093; G02B 27/145; G02B 27/283; G02B 2027/0178; G02B 2027/0138; G02B 2027/0125; G02B 2027/0174; G02B 2006/12116
  See application file for complete search history.

(56) References Cited

U.S. PATENT DOCUMENTS

| | | | |
|---|---|---|---|
| 7,175,332 B2 | 2/2007 | Tang | |
| 7,976,208 B2 | 7/2011 | Travis et al. | |
| 8,079,718 B1 | 12/2011 | Zhai et al. | |
| 9,225,971 B2* | 12/2015 | Woodgate | G02F 1/011 |
| 10,241,330 B2* | 3/2019 | Popovich | G02F 1/29 |
| 10,353,210 B2* | 7/2019 | Wyrwas | G02B 26/101 |
| 2005/0123229 A1 | 6/2005 | Huck et al. | |
| 2010/0103078 A1 | 4/2010 | Mukawa et al. | |
| 2011/0043142 A1 | 2/2011 | Travis et al. | |
| 2012/0069031 A1 | 3/2012 | Bita et al. | |
| 2013/0201094 A1 | 8/2013 | Travis et al. | |
| 2014/0160543 A1* | 6/2014 | Putilin | G02B 27/0103 359/9 |
| 2016/0033698 A1 | 2/2016 | Escuti et al. | |
| 2018/0335629 A1* | 11/2018 | Cheng | G02B 5/3016 |
| 2019/0018245 A1* | 1/2019 | Cheng | G02B 6/0076 |
| 2019/0212573 A1 | 7/2019 | Popovich et al. | |
| 2019/0369403 A1* | 12/2019 | Leister | G02B 27/0176 |
| 2020/0209667 A1 | 7/2020 | Sharlin et al. | |
| 2020/0310024 A1 | 10/2020 | Danziger et al. | |
| 2020/0310537 A1* | 10/2020 | Simmons | H04N 13/339 |
| 2020/0371280 A1* | 11/2020 | Geng | G02B 27/145 |
| 2020/0371387 A1* | 11/2020 | Gollier | G02B 5/3025 |
| 2020/0371388 A1* | 11/2020 | Geng | G02B 6/0031 |
| 2020/0371389 A1* | 11/2020 | Geng | G02B 27/145 |
| 2021/0072551 A1* | 3/2021 | Collier | G02B 27/0172 |

FOREIGN PATENT DOCUMENTS

| | | |
|---|---|---|
| WO | WO2018/146326 A2 | 8/2018 |
| WO | WO2018/175649 A1 | 9/2018 |
| WO | WO2018/175653 A1 | 9/2018 |

OTHER PUBLICATIONS

Facebook Technologies, LLC, international Search Report and Written Opinion, PCT/US2020/033688, dated Oct. 29, 2020, 16 pgs.

Facebook Technologies, LLC, international Search Report and Written Opinion, PCT/US2020/033515, dated Aug. 17, 2020, 11 pgs.

Geng, Office Action, U.S. Appl. No. 15/930,318, dated Dec. 9, 2020, 9 pgs.

Geng, Office Action, U.S. Appl. No. 16/862,399, dated Dec. 16, 2020, 9 pgs.

Large M J et al., "Parallel Optics in Waveguide Displays: A Flat Panel Autostereoscopic Display," Journal of Display Technology, IEEE Service Center, New York NY, US, vol. 6, No. 10, Oct. 1, 2010 pp. 431-437, XP011311965.

Moller C et al., "Flat Panel Time Multiplexed Autostereoscopic Display Using an Optical WedgeA Waveguide," IDW, 3D2-1, London UK, Jan. 1, 2004, pp. 1443-1446, XP007013996.

Facebook Technologies, LLC, international Search Report and Written Opinion, PCT/US2020/046576, dated Nov. 12, 2020, 9 pgs.

Facebook Technologies, LLC, international Search Report and Written Opinion, PCT/US2020/047281, dated Nov. 9, 2020, 9 pgs.

* cited by examiner

OPTICAL WAVEGUIDE BEAM SPLITTER WITH PLURAL PARTIAL EXTRACTION FEATURES FOR DISPLAY

RELATED APPLICATIONS

This application claims the benefit of, and priority to, U.S. Provisional Patent Application Ser. No. 62/850,521, filed May 20, 2019. This application is related to U.S. patent application Ser. No. 16/862,396, entitled "Optical Waveguide Beam Splitter with Reflective Polarizers for Display" filed Apr. 29, 2020, U.S. patent application Ser. No. 16/862,399, entitled "Optical Waveguide Beam Splitter with Polarization Volume Gratings for Display" filed Apr. 29, 2020, and U.S. patent application Ser. No. 16/862,403, entitled "Optical Waveguide Beam Splitter for Directional Illumination of Display" filed Apr. 29, 2020. All of these applications are incorporated by reference herein in their entireties.

TECHNICAL FIELD

This relates generally to head-mounted display devices, and more specifically to display devices including spatial light modulators.

BACKGROUND

Head-mounted display devices (also called herein head-mounted displays) are gaining popularity as means for providing visual information to a user. For example, the head-mounted display devices are used for virtual reality, mixed reality, and augmented reality operations.

There is a need for high resolution, compact-sized and light-weighted display systems for enhancing user's experience with head-mounted display devices. Spatial light modulators (SLM) have high brightness and high efficiency. However, uniform illumination of spatial light modulators with compact-sized and light-weighted optical devices can be challenging.

SUMMARY

Several challenges in illumination of spatial light modulators, including providing uniform illumination for spatial light modulators, can be addressed by the disclosed optical devices and systems.

In accordance with some embodiments, an optical device for providing illumination light includes an optical waveguide and a plurality of reflective polarizers. The plurality of reflective polarizers includes a first reflective polarizer and a second reflective polarizer that is separate from the first reflective polarizer. The first reflective polarizer and the second reflective polarizer are disposed inside the optical waveguide so that the first reflective polarizer receives light propagating inside the optical waveguide, redirects a first portion of the light in a first direction, and transmits a second portion of the light in a second direction non-parallel to the first direction. The second reflective polarizer receives the second portion of the light from the first reflective polarizer, redirects a third portion of the light in the second direction, and transmits a fourth portion of the light. A ratio between the first portion and the second portion of the light has a first value (e.g., an intensity ratio, such as a ratio between the intensities of the first portion and the second portion of light) and a ratio between the third portion and the fourth portion of the light has a second value distinct from the first value (e.g., an intensity ratio, such as a ratio between the intensities of the third portion and the fourth portion of light).

In accordance with some embodiments, a method includes receiving light with a first reflective polarizer located within an optical waveguide. The method includes redirecting, with the first reflective polarizer, a first portion of the light and transmitting a second portion of the light. A ratio between the first portion and the second portion of light (e.g., an intensity ratio, such as a ratio between the intensities of the first portion and the second portion of light) has a first value. The method also includes receiving the second portion of the light with a second reflective polarizer located within the optical waveguide. The second reflective polarizer is distinct and separate from the first reflective polarizer. The method further includes redirecting, with the second reflective polarizer, a third portion of the light and transmitting a fourth portion of the light. A ratio between the third portion and the fourth portion of the light (e.g., an intensity ratio, such as a ratio between the intensities of the third portion and the fourth portion of light) has a second value distinct from the first value.

In accordance with some embodiments, an optical device for providing illumination light includes an optical waveguide and a plurality of polarization selective elements. The plurality of polarization selective elements is disposed adjacent to the optical waveguide so that a respective polarization selective element receives light in a first direction, and redirects a first portion of the light in a second direction. A second portion, distinct from the first portion, of the light undergoes total internal reflection, thereby continuing to propagate inside the optical waveguide.

In accordance with some embodiments, a method for providing illumination light includes receiving light in a first direction with a respective polarization selective element of a plurality of polarization selective elements. The plurality of polarization selective elements is disposed adjacent to an optical waveguide. The method also includes redirecting, with the respective polarization selective element, a first portion of the light in a second direction. A second portion, distinct from the first portion, of the light undergoes total internal reflection, thereby continuing to propagate inside the optical waveguide.

In accordance with some embodiments, an optical device includes a spatial light modulator and an optical waveguide with a plurality of extraction features. The plurality of extraction features is positioned relative to the optical waveguide so that a respective extraction feature receives light, having propagated within the optical waveguide, in a first direction and directs a first portion of the light in a second direction distinct from the first direction. The first portion exits the optical waveguide to illuminate at least a portion of the spatial light modulator. The respective extraction feature also directs a second portion, distinct from the first portion, of the light to undergo total internal reflection, thereby continuing to propagate within the optical waveguide.

In accordance with some embodiments, a head-mounted display device includes any optical device described herein.

In accordance with some embodiments, a method for providing illumination light includes receiving light, having propagated within an optical waveguide, in a first direction with a respective extraction feature of a plurality of extraction features. The plurality of extraction features is optically coupled with the optical waveguide. The method also includes directing, with the respective extraction feature, a first portion of the light in a second direction to exit the optical waveguide, and directing a second portion, distinct from the first portion, of the light to undergo total internal reflection, thereby continuing to propagate within the optical waveguide. The method further includes illuminating at least a portion of a spatial light modulator with the first portion of the light.

In accordance with some embodiments, an optical device includes a light source configured to provide illumination light and a waveguide. The waveguide has an input surface, an output surface, and an output coupler. The output surface is distinct from and non-parallel to the input surface. The waveguide is configured to receive, at the input surface, the illumination light provided by the light source and propagate the illumination light via total internal reflection. The waveguide is also configured to redirect, by the output coupler, the illumination light so that the illumination light is output from the output surface for illuminating a spatial light modulator.

In accordance with some embodiments, a method of providing illumination light includes providing, from a light source, illumination light and receiving, at an input surface of a waveguide, the illumination light provided by the light source. The waveguide includes an output surface and an output coupler. The output surface is distinct from and non-parallel to the input surface. The method also includes propagating, in the waveguide, the illumination light via total internal reflection and redirecting, by the output coupler, the illumination light so that the illumination light is output from the output surface of the waveguide for illuminating a spatial light modulator.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
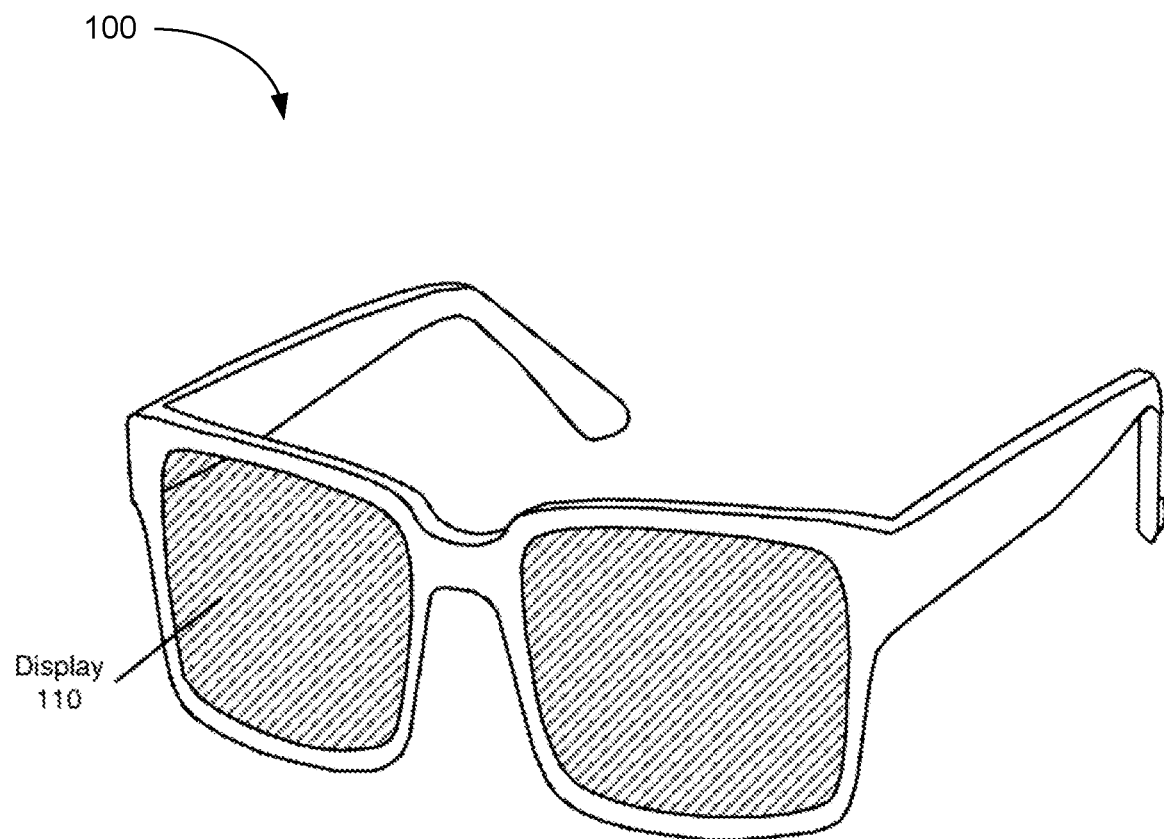
FIG. 1 is a perspective view of a display device in accordance with some embodiments.

These figures are not drawn to scale unless indicated otherwise.

DETAILED DESCRIPTION

Spatial light modulator (SLM) displays have high brightness and high efficiency, and can be used in head-mounted display devices. In addition, reflective spatial light modulators, such as Liquid Crystal on Silicone (LCoS) displays can have a reduced screen door effect (e.g., visibility of gaps between pixels) compared to conventional transmissive displays because circuitry required for pixels can be disposed behind the pixels, rather than around the pixels, thereby allowing a smaller gap between adjacent pixels. However, spatial light modulators generally require uniform illumination light to provide high quality images.

The disclosed optical devices include optical waveguides for illuminating spatial light modulators with improved uniformity. The disclosed optical waveguides can be compact and light, and thus, the disclosed optical waveguides can improve image quality and device efficiency in display devices with spatial light modulator displays.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first reflective polarizer could be termed a second reflective polarizer, and, similarly, a second reflective polarizer could be termed a first reflective polarizer, without departing from the scope of the various described embodiments. The first reflective polarizer and the second reflective polarizer are both reflective polarizers, but they are not the same reflective polarizer.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
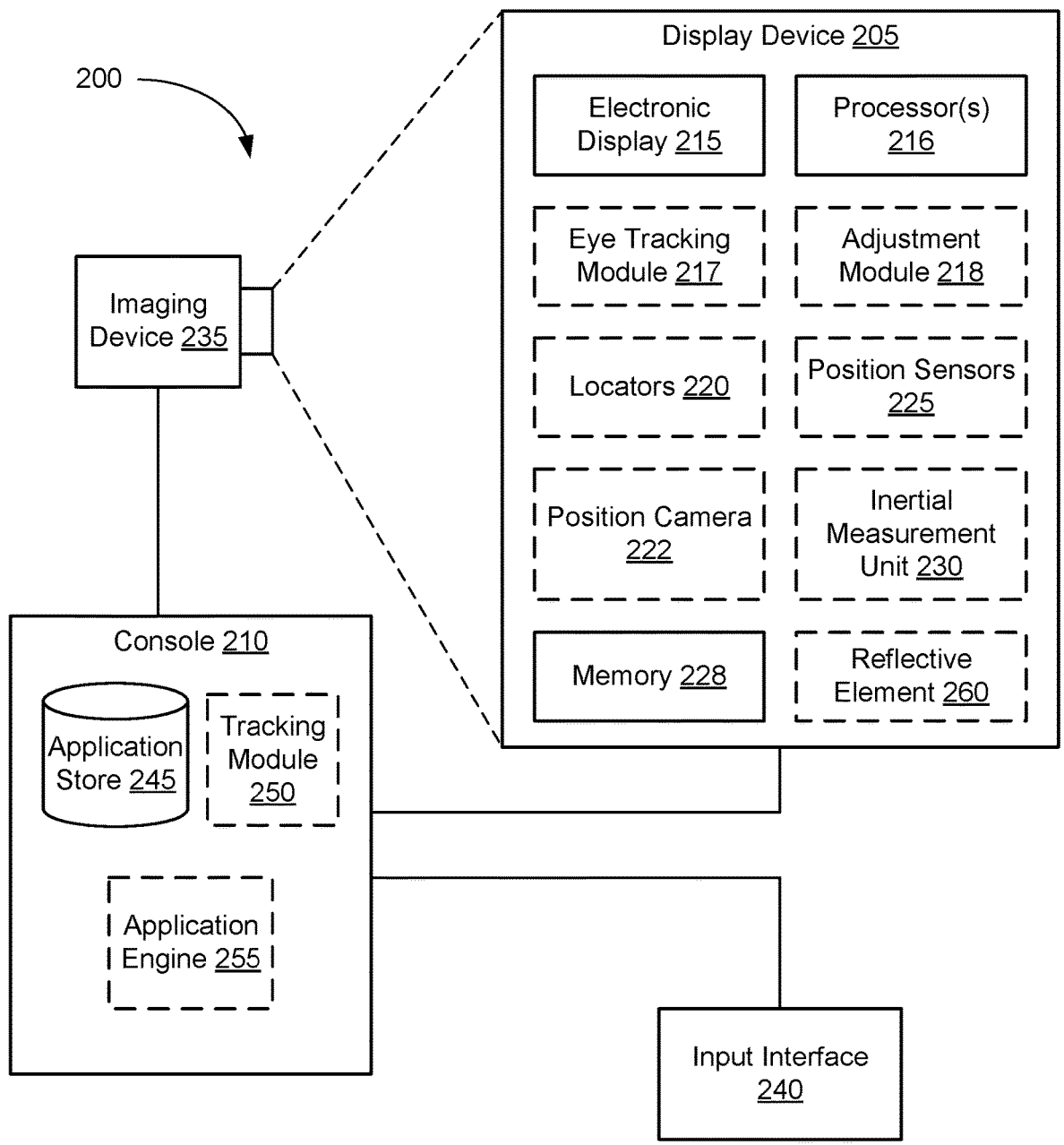
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode (OLED), an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
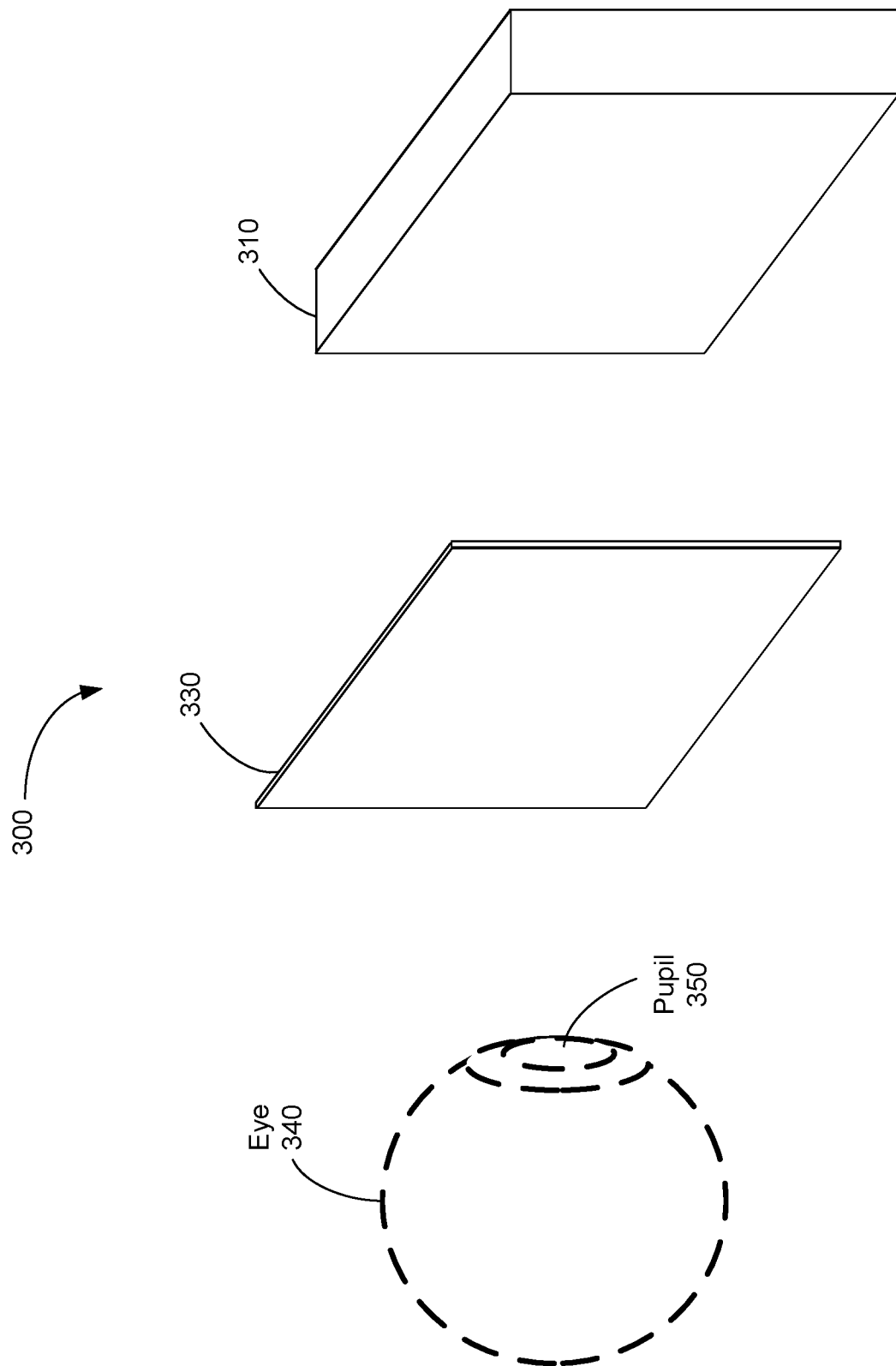
FIG. 3 is an isometric view of a display device in accordance with some embodiments.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 (e.g., a light emission device array) and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, an array of vertical cavity surface-emitting lasers (VCSELs) or some combination thereof.

In some embodiments, light emission device 310 includes an emission intensity array (e.g., a transmissive spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device 310. In some embodiments, the IR detector array is integrated into light emission device 310.

In some embodiments, light emission device 310 including an emission intensity array make up a display element. Alternatively, the display element includes light emission device 310 (e.g., when light emission device 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a reflective spatial light modulator (SLM), such as a Liquid Crystal on Silicon (LCoS) spatial light modulator. The spatial light modulator is configured to modulate an amplitude or phase of at least a portion of illumination light and output modulated light (e.g., image light). In some embodiments, the LCoS spatial light modulator includes liquid crystals. In some embodiments, the LCoS spatial light modulator includes ferroelectric liquid crystals. The reflective spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon). In some embodiments, display device 300 includes multiple reflective spatial light modulators (e.g., a first reflective spatial light modulator for a first color, such as red, a second reflective spatial light modulator for a second color, such as green, and a third reflective spatial light modulator for a third color, such as blue). Such reflective spatial light modulator requires an illuminator that provides light to the reflective spatial light modulator.

Figure 4:
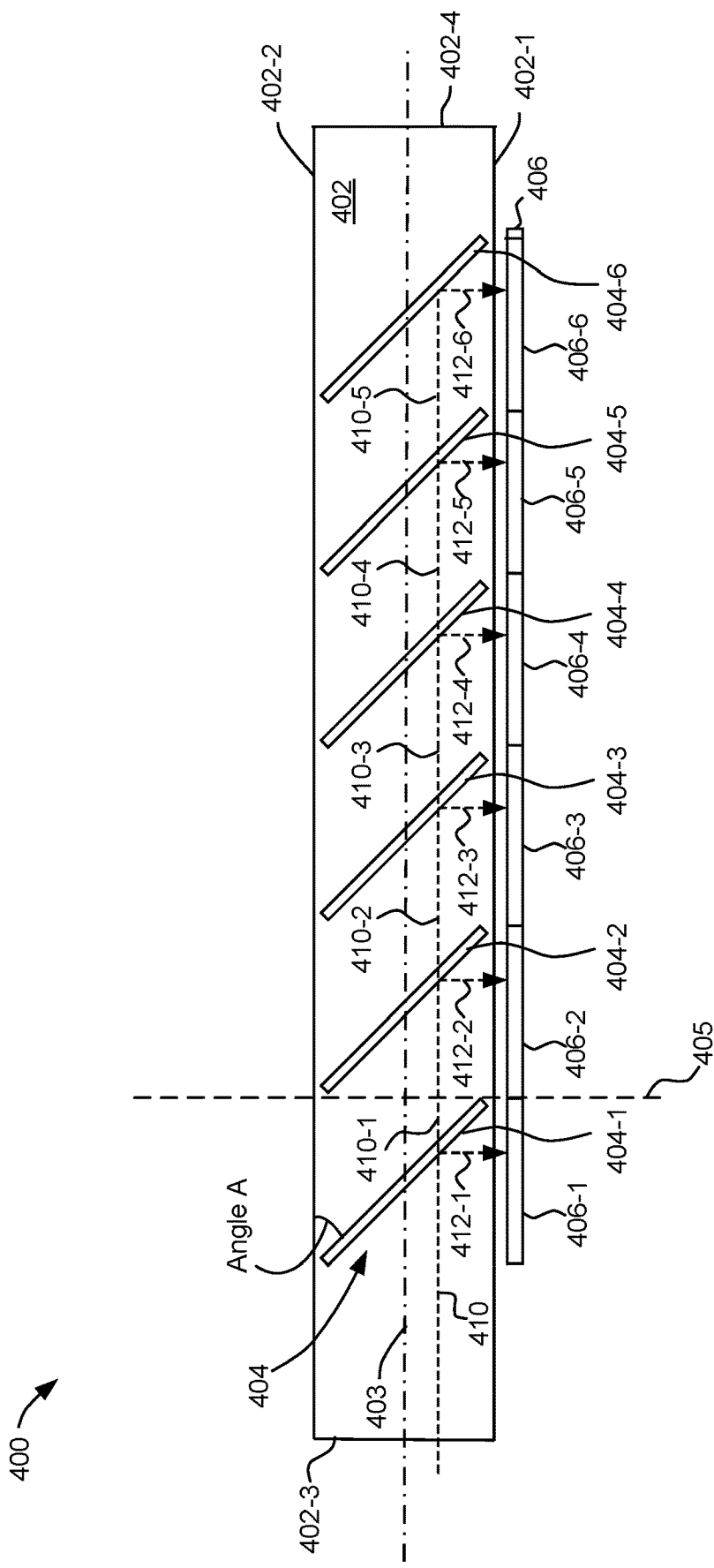
FIG. 4 is a schematic diagram illustrating a waveguide beam splitter in accordance with some embodiments.

FIG. 4 is a schematic diagram illustrating waveguide beam splitter 400 in accordance with some embodiments. Waveguide beam splitter 400 includes waveguide 402 (e.g., an optical waveguide) and two or more reflective polarizers 404 (e.g., reflective polarizers 404-1, 404-2, 404-3, 404-4, 404-5, and 404-6). In some embodiments, waveguide beam splitter 400 is optically coupled with spatial light modulator 406 and is configured to provide illumination light to spatial light modulator 406. In some embodiments, spatial light modulator 406 is a reflective spatial light modulator display (e.g., an LCoS). In some embodiments, spatial light modulator 406 is a transmission spatial light modulator display.

Waveguide 402 includes surface 402-1 and surface 402-2 opposite to surface 402-1. In some embodiments, surfaces 402-1 and 402-2 are parallel to each other, defining a reference plane (e.g., reference plane 403 of waveguide 402 parallel to surface 402-1 or surface 402-2) positioned at an equal distance from surface 402-1 and surface 402-2. Waveguide 402 also includes end surfaces 402-3 and 402-4 opposite to each other. In some embodiments, end surfaces 402-3 and 402-4 are perpendicular to surfaces 402-1 and 402-2. In some embodiments, end surfaces 402-3 and 402-4 are tilted relative to surfaces 402-1 and 402-2 (e.g., end surface 402-3 may form an acute angle with surface 402-1). In some embodiments, end surface 402-3 is optically coupled with a light source and waveguide 402 receives light from the light source through end surface 402-3.

In some embodiments, reflective polarizers 404 are positioned parallel or substantially parallel to each other, as shown in FIG. 4. Reflective polarizers 404 are at least partially embedded inside waveguide 402. In some embodiments, surfaces 402-1 and 402-2 are in direct contact with surface 402-1 and/or surface 402-2. In some embodiments, reflective polarizers 404 are positioned so that reflective polarizers 404 intersect reference plane 403 of waveguide 402. Reflective polarizers 404 are non-parallel and non-perpendicular to surfaces 402-1 and 402-2 of waveguide 402 so that reflective polarizers 404 define angle A with respect to surface 402-2. In some embodiments, angle A has a value ranging between 25 degrees and 65 degrees, between 30 degrees and 60 degrees, between 35 degrees and 55 degrees, or between 40 degrees and 50 degrees. In some embodiments, angle A has a value of 45 degrees. In some embodiments, reflective polarizers 404 are separate from each other. In some embodiments, reflective polarizer 404-1 is at a first distance from end surface 402-3, reflective polarizer 404-2 is at a second distance greater than the first distance from end surface 402-3, reflective polarizer 404-3 is at a third distance greater than the second distance from end surface 402-3, etc. In some embodiments, reflective polarizers 404 are spaced apart from each other such that they do not overlap with each other in a vertical direction (e.g., projections of reflective polarizers 404 in a direction perpendicular to reference plane 403 of waveguide 402 do not overlap with one another). In such embodiments, reflective polarizers 404 are spaced apart from one another so that image light from spatial light modulator 406 propagating in a vertical direction is transmitted through only one of the reflective polarizers 404 (e.g., reflective polarizer 404-1 and reflective polarizer 404-2 are spaced apart from each other so that none of image light from spatial light modulator 406 transmitted through reflective polarizer 404-1 is transmitted through reflective polarizer 404-2). In some configurations, vertical reference line 405 (e.g., vertical reference line 405 being perpendicular to reference plane 403 of waveguide 402) is defined in a way that a lower end portion of reflective polarizer 404-1 and a top end portion of reflective polarizer 404-2 are adjacent to vertical reference line 405 on opposite sides of vertical reference line 405 without overlapping vertical reference line 405. Therefore, the lower end portion of reflective polarizer 404-1 and the top end portion of reflective polarizer 404-2 do not overlap in the vertical direction.

In some embodiments, reflective polarizers 404 include stretched birefringent polymer stacks, liquid crystal polymers, or a combination thereof. Stretched birefringent polymer stacks include a plurality of birefringent layers with alternating birefringent properties (e.g., alternating positively and negatively birefringent layers). Stretched birefringent polymer stacks or liquid crystal polymers may be configured to have distinct reflectivities. Reflectivity refers to an optical property of a material describing what portion of incident light is reflected from the material. In some cases, reflectivity (R) is defined as a ratio between an intensity of reflected light ($I_R$) and an intensity of incident light ($I_I$), ($R=I_R/I_I$). In some embodiments, a layer of liquid crystal polymers has a reflectivity determined based on a thickness of the layer and/or alignment of the liquid crystals. In some embodiments, a stretched birefringent polymer stack has a reflectivity determined based on a magnitude and/or direction of stretching of the polymer stack. For example, stretching of the birefringent polymer stack changes a difference between refractive indexes of the alternating birefringent layers in x- and/or y-direction in such a way that stretching the stack in a particular direction changes the reflectivity of the stack.

In some embodiments, reflective polarizers 404 include Fresnel structures or prisms. In some embodiments, reflective polarizers 404 include Fresnel structures or prisms coated with a stretched birefringent polymer stack or a layer of liquid crystal polymers.

Reflective polarizers 404 are configured to reflect at least a portion of light having a first polarization while transmitting a second portion of the light having a second polarization distinct from the first polarization. For example, the first polarization is a first circular polarization or a first linear polarization and the second polarization is distinct from the first polarization (e.g., the second polarization is a second circular polarization orthogonal to the first circular polarization or a second linear polarization orthogonal to the first linear polarization).

Reflective polarizer 404-1 has a first reflectivity $R_1$, reflective polarizer 404-2 has a second reflectivity $R_2$, reflective polarizer 404-3 has a third reflectivity $R_3$, reflective polarizer 404-4 has a fourth reflectivity $R_4$, reflective polarizer 404-5 has a fifth reflectivity $R_5$, and reflective polarizer 404-6 has a sixth reflectivity $R_6$.

In FIG. 4, reflective polarizer 404-1 receives light 410 and reflects portion 412-1 of light 410 while transmitting portion 410-1 of light 410. Portion 412-1 of light 410 has a first intensity (e.g., $I_{412-1}$) and portion 410-1 has a second intensity (e.g., $I_{410-1}$). Reflectivity $R_1$ of reflective polarizer 404-1 is $I_{412-1}/I_I$, where $I_I$ represents the intensity of light 410 and $I_{412-1}$ represents the intensity of portion 412-1 of light 410.

In some embodiments, reflectivities $R_1$ through $R_6$ are distinct from each other. In some embodiments, reflectivity $R_2$ is greater than reflectivity $R_1$, reflectivity $R_3$ is greater than reflectivity $R_2$, reflectivity $R_4$ is greater than reflectivity $R_3$, etc. In some embodiments, the reflectivities of reflective polarizers 404 range between ⅙ and one. For example, in some configurations, reflectivity $R_1$ of reflective polarizer 404-1 is ⅙, reflectivity $R_2$ of reflective polarizer 404-2 is ⅕, reflectivity $R_3$ of reflective polarizer 404-3 is ¼, reflectivity $R_4$ of reflective polarizer 404-4 is ⅓, reflectivity $R_5$ of reflective polarizer 404-5 is ½, and reflectivity $R_6$ of reflective polarizer 404-6 is one. In some embodiments, the reflectivities of reflective polarizers 404 are selected so that intensities of portions of light directed to illuminate spatial light modulator 406 are equal or substantially equal (varying by 10% or less, 5% or less, 3% or less, 2% or less, 1% or less, etc.). For example, intensity $I_{412-1}$ of portion 412-1, intensity $I_{412-2}$ of portion 412-2, intensity $I_{412-3}$ of portion 412-3, intensity $I_{412-4}$ of portion 412-4, intensity $I_{412-5}$ of portion 412-5, and intensity $I_{412-6}$ of portion 412-6 are equal or substantially equal. Thereby, different regions of spatial light modulator 406 (e.g., regions 406-1, 406-2, 406-3, 406-4, 406-5, and 406-6) are uniformly illuminated.

In configurations in which a reflective polarizer has a low loss, reflectivity of the reflective polarizer is also related to a ratio between an intensity of light transmitted (e.g., portion 410-1 of light 410 having intensity $I_{410-1}$) and an intensity of redirected light (e.g., portion 412-1 of light having intensity $I_{412-1}$). For reflective polarizer 404-1 having reflectivity $R_1=I_{412-1}/I_I$ (i.e., $I_{412-1}=R_1I_I$), the ratio between the intensity of light transmitted and the intensity of redirected light is $V_1=I_{410-1}/I_{412-1}$, where $I_{410-1}=I_I-I_{412-1}=I_I-R_1I_I$. Thus, $V_1=(I_I-R_1I_I)/I_{412-1}=(1-R_1)I_I/I_{412-1}=(1-R_1)/R_1=1/R_1-1$. For example, when $R_1=\frac{1}{6}$, value $V_1=5$ (e.g., $V_1=I_{410-1}/I_{412-1}=(I_I-R_1I_I)/R_1I_I=(1-\frac{1}{6})/(\frac{1}{6})=5$). Consequently, for reflective polarizer 404-2 having reflectivity $R_2=I_{412-2}/I_{410-1}$ (i.e., $I_{412-2}=R_2I_{410-1}$), such ratio corresponds to value $V_2=I_{410-2}/I_{412-2}$, where $I_{410-2}=I_I-I_{412-1}-I_{412-2}=I_I-R_1I_I-R_2(I_I-R_1I_I)$. For example, when $R_1=\frac{1}{6}$ and $R_2=\frac{1}{5}$, value $V_2=4$ (e.g., $V_2=I_{410-2}/I_{412-2}=(I_I-I_{412-1}-I_{412-2})/I_{412-2}=(I_I-I_{412-1}-R_2(I_I-I_{412-1}))/(R_2(I_I-I_{412-1}))=(1-\frac{1}{6}-\frac{1}{5}(1-\frac{1}{6}))/(\frac{1}{5}(1-\frac{1}{6}))=4$). A relationship between values $V_1$ and $V_2$ of consecutive reflective polarizers 404-1 and 404-2 is described as follows:

$$V_1 = \frac{I_{410-1}}{I_{412-1}} = \frac{I_I - I_{412-1}}{I_{412-1}} \rightarrow I_{412-1} = \frac{I_I}{V_1 + 1},$$

$$V_2 = \frac{I_{410-2}}{I_{412-2}} = \frac{I_I - I_{412-1} - I_{412-2}}{I_{412-2}},$$

substitute $I_{412-2} = I_{412-1}$(uniform illumination) $\rightarrow V_2 = \frac{I_I - 2 \times I_{412-1}}{I_{412-1}}$ substitute $I_{412-1} = \frac{I_I}{V_1 + 1} \rightarrow V_2 = \frac{I_I - 2 \times \left(\frac{I_I}{V_1 + 1}\right)}{\left(\frac{I_I}{V_1 + 1}\right)} = \frac{I_I(V_1 + 1 - 2)}{V_1 + 1} \times$ $$\frac{V_1 + 1}{I_I} = V_1 - 1.$$

As shown above, a relationship between the values (V) of consecutive reflective polarizers of reflective polarizers 404 can be derived as $V_{n+1}=V_n-1$, where n corresponds to a sequential number of a respective reflective polarizer (e.g., n=1 corresponds to reflective polarizer 404-1, n=2 corresponds to reflective polarizer 404-2, n=3 corresponds to reflective polarizer 404-3, etc.).

Figure 5A:
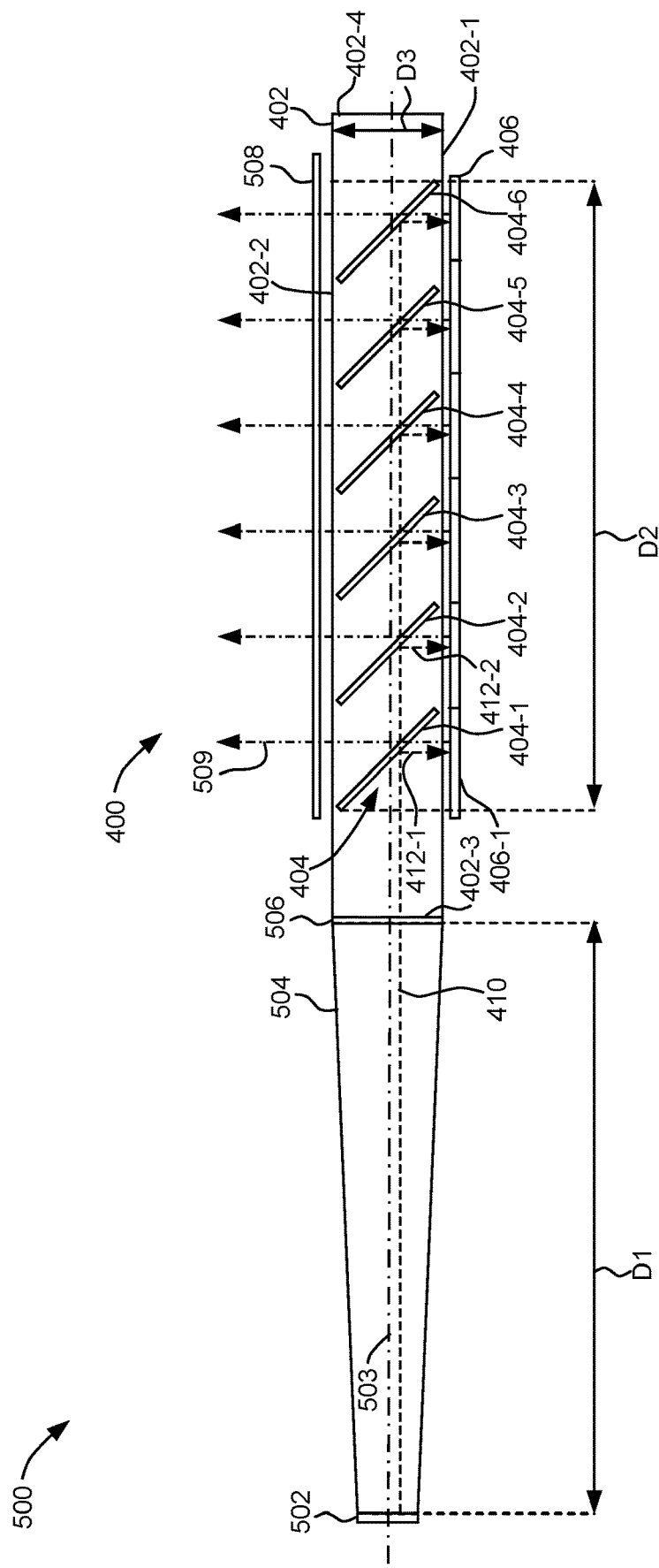
FIG. 5A is a schematic diagram illustrating an optical device for providing illumination light in accordance with some embodiments.

FIG. 5A is a schematic diagram illustrating display device 500 in accordance with some embodiments. Display device 500 includes waveguide beam splitter 400, light source 502, and spatial light modulator 406. Light source 502 is configured to provide illumination light (e.g., light 410) to waveguide 402 so that light 410 propagates within waveguide 402 (e.g., by bouncing off surfaces 402-1 and 402-2 of waveguide 402 via total internal reflection), and impinges on reflective polarizers 404. Reflective polarizers 404 are configured to redirect respective portions of light 410 toward spatial light modulator 406 such that different regions of spatial light modulator 406 are illuminated (e.g., reflective polarizers 404 may uniformly illuminate an entire surface of spatial light modulator 406). Spatial light modulator 406 is configured to project image light (e.g., image light 509) through waveguide beam splitter 400. In some embodiments, spatial light modulator 406 projects at least a portion of the received light as image light (e.g., image light 509). For example, spatial light modulator 406 includes a plurality of pixels (e.g., in FIG. 4, each region of regions 406-1 to 406-6 includes a plurality of pixels) and each pixel of the plurality of pixels is individually activatable. While a respective pixel of the plurality of pixels is in an activated state, the respective pixel reflects the received light (e.g., the pixel receiving portion 412-1 of light 410 reflects the received light as image light 509), and while the respective pixel is in a deactivated state, the respective pixel does not reflect the received light (e.g., the pixel receiving portion 412-1 of light 410 does not reflect the received light). Instead, in some configurations, the respective pixel may absorb the received light while the respective pixel is in the deactivated state. While reflecting the light, the pixels may further modulate intensity and/or polarization of the light in order to project image light.

In some embodiments, light source 502 is positioned so that a reference plane of waveguide 402 (e.g., reference plane 403 in FIG. 4) corresponds to optical axis 503 of light source 502. In some embodiments, light source 502 is separated from surface 402-3 of waveguide 402 by distance D1. In some embodiments, distance D1 ranges from 1 mm to 10 mm, from 1 mm to 8 mm, from 1 mm to 5 mm, from 2 mm to 8 mm, from 2 mm to 6 mm, from 2 mm to 4 mm, from 3 mm to 5 mm, or from 3 mm to 4 mm. In some embodiments, distance D1 is 3 mm.

In some embodiments, light source 502 includes one or more light emitting devices, such as one or more light emitting diodes (LED), one or more superluminescent diodes (SLED), one or more vertical cavity surface emitting lasers (VCSEL), or one or more laser diodes. In some embodiments, light source 502 includes an array of light emitting devices. In some embodiments, the array of light emitting devices has a first dimension (e.g., a width) that is less than or equal to 10 mm, less than or equal to 8 mm, less than or equal to 6 mm, less than or equal to 4 mm, less than or equal to 2 mm, less than or equal to 1 mm, less than or equal to 0.5 mm, less than or equal to 0.3 mm, or less than or equal to 0.2 mm. In some embodiments, the array of light emitting devices has a second dimension (e.g., a height) distinct from the first dimension that is less than or equal to 20 mm, less than or equal to 10 mm, less than or equal to 8 mm, less than or equal to 6 mm, less than or equal to 5 mm, less than or equal to 4 mm, less than or equal to 3 mm, less than or equal to 2 mm, or less than or equal to 1 mm. In some embodiments, the first dimension is 0.3 mm and the second dimension is 2 mm.

In some embodiments, display device 500 further includes one or more optical elements (e.g., an optical guide) disposed between light source 502 and waveguide 402. In some embodiments, the one or more optical elements include a tapered light guide (e.g., tapered light guide 504 shown in FIG. 5A), a reflector (e.g., compound parabolic concentrator 616 described below with respect to FIG. 6A), or a lens. In some embodiments, the one or more optical elements are configured to change the divergence of transmitted light so that the divergence of the transmitted light matches the collection angle of waveguide 402. For example, tapered light guide 504 is configured to receive light 410 output by light source 502 and steer light 410 into waveguide 402. In some embodiments, tapered light guide 504 is further configured to collimate light 410. For example, light source 502 is an LED providing non-collimated light and tapered light guide 504 collimates the light provided by the LED. In some configurations, in which light source 502 has a small etendue, such as a laser or a SLED, light source 502 is optically coupled with a diffuser, which may be used for etendue matching.

In some embodiments, display device 500 further includes polarizer 506 (e.g., an absorptive polarizer) disposed between light source 502 and waveguide 402. Polarizer 506 is configured to convert unpolarized light (e.g., light from an LED light source) to polarized light by transmitting light having a particular polarization without transmitting light having a polarization distinct from (e.g., orthogonal to)

the particular polarization. For example, polarization 506 may absorb light having the polarization distinct from the particular polarization.

In some embodiments, waveguide beam splitter 400 has height D3 defined between surfaces 402-1 and 402-2 of waveguide 402. In some embodiments, height D3 is less than or equal to 1 mm, less than or equal to 0.8 mm, less than or equal to 0.6 mm, less than or equal to 0.5 mm, or less than or equal to 0.3 mm. In some embodiments, D3 is 0.5 mm. In some embodiments, spatial light modulator 406 has an area defined by a first dimension (e.g., a width) ranging from 1 mm to 10 mm, 1 mm to 8 mm, 1 mm to 6 mm, or 1 mm to 5 mm and a second dimension ranging from 1 mm to 10 mm, 1 mm to 8 mm, 1 mm to 6 mm, or 1 mm to 5 mm. In some embodiments, spatial light modulator 406 has an area of 3 mm×3 mm. In some embodiments, reflective polarizers 404 are arranged over an area covering approximately the area of spatial light modulator 406. In some embodiments, width D2 defined between a top end portion of reflective polarizer 404-1 and an low end portion of reflective polarizer 404-6 ranges from 1 mm to 10 mm, 1 mm to 8 mm, 1 mm to 6 mm, 1 mm to 4 mm, 1 mm to 3 mm or 1 mm to 2 mm. In some embodiments, width D2 is 3 mm.

In some embodiments, display device 500 further includes polarizer 508 (e.g., a cleanup polarizer such as a linear polarizer) optically coupled with surface 402-2 of waveguide 402 of waveguide beam splitter 400. Polarizer 508 is positioned to receive image light 509 projected by spatial light modulator 406 and transmitted through waveguide beam splitter 400. In some embodiments, polarizer 508 is positioned to transmit at least a portion of image light 509 having a particular polarization (e.g., light having a polarization transmitted by reflective polarizers 404). Although FIGS. 5B-5C and 6B-6D do not show polarizer 508, display devices shown in FIGS. 5B-5C and 6B-6D may also include, or be coupled with, polarizer 508 to absorb light having a polarization other than the particular polarization.

Figure 5B:
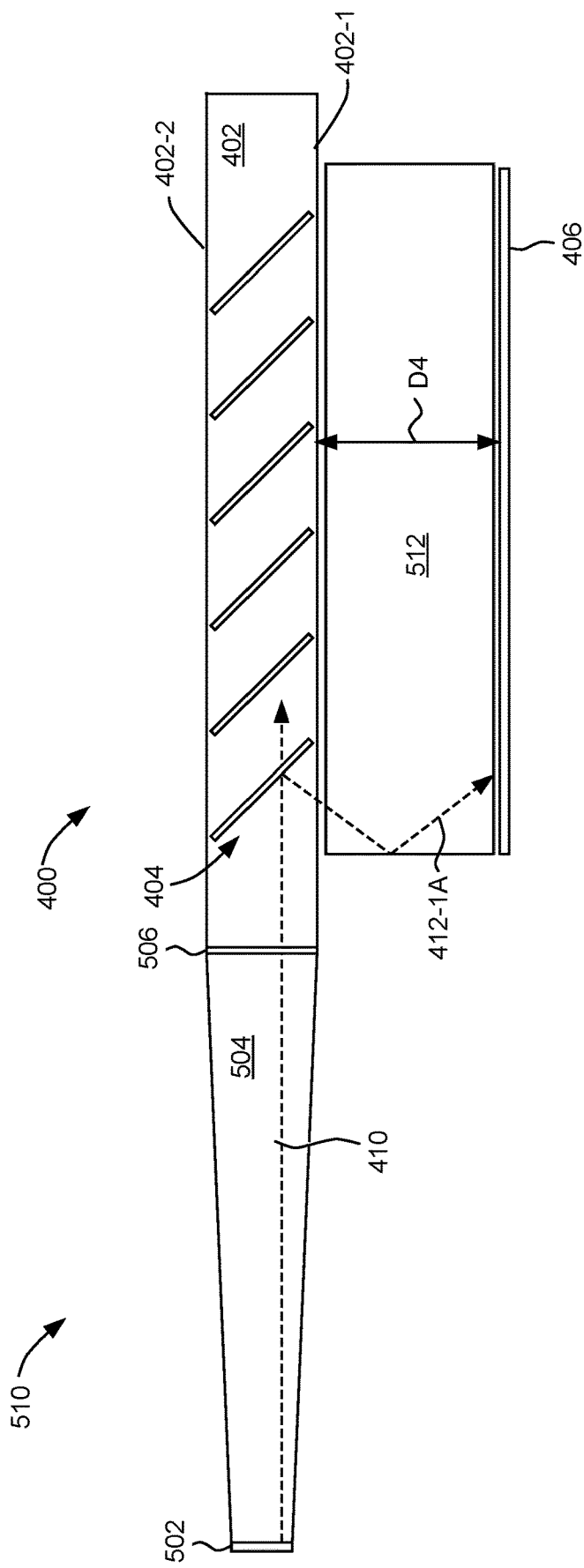
FIG. 5B is a schematic diagram illustrating an optical device for providing illumination light in accordance with some embodiments.

FIG. 5B is a schematic diagram illustrating display device 510 in accordance with some embodiments. Display device 510 is similar to display device 500 except that in display device 510, spatial light modulator 406 is separated from surface 402-1 of waveguide 402 by distance D4. In some embodiments, distance D4 is at least 0.5 mm, at least 0.6 mm, at least 0.7 mm, at least 0.8 mm, at least 0.9 mm, at least 1 mm, at least 2 mm, at least 3 mm, at least 5 mm, or at least 10 mm. In some embodiments, distance D4 is 1 mm. In contrast, in display device 500, spatial light modulator 406 may be positioned adjacent to surface 402-1 of waveguide 402 (e.g., at a distance less than 0.5 mm). In some embodiments, the distance between a spatial light modulator and a waveguide reduces visibility of optical artifacts arising from, e.g., non-uniformity in the waveguide. In some cases, light exiting waveguide 402 is spread further while traveling the distance, thereby increasing uniformity of an illumination light provided onto the spatial light modulator. In some embodiments, display device 510 further includes light guide 512 disposed between surface 402-1 of waveguide 402 and spatial light modulator 406. In some embodiments, light guide 512 extends from surface 402-1 to a surface of spatial light modulator 406. In some embodiments, there is an air gap between surface 402-1 and light guide 512. In some embodiments, there is an air gap between light guide 512 and spatial light modulator 406. In some embodiments, light guide 512 is configured to limit spreading of light propagating from reflective polarizers 404 (e.g., portion 412-1A of light 410). As shown, portion 412-1A of light redirected by reflective polarizer 404-1 is confined so that portion 412-1A impinging on a side surface of light guide 512 is redirected toward spatial light modulator 406. In some cases, the confinement by light guide 512 reduces loss of light near edges of waveguide 402 and thereby provides more uniform illumination onto spatial light modulator 406 around the edges of spatial light modulator 406.

In FIGS. 4 and 5A-5B, light 410 is illustrated as propagating in a direction parallel to surface 402-1 and 402-2 for simplicity. However, display devices shown in FIGS. 4 and 5A-5B may work with light propagating at an angle (e.g., light that propagates in a direction that is non-parallel and non-perpendicular to surface 402-1 or surface 402-2) as well.

Figure 5C:
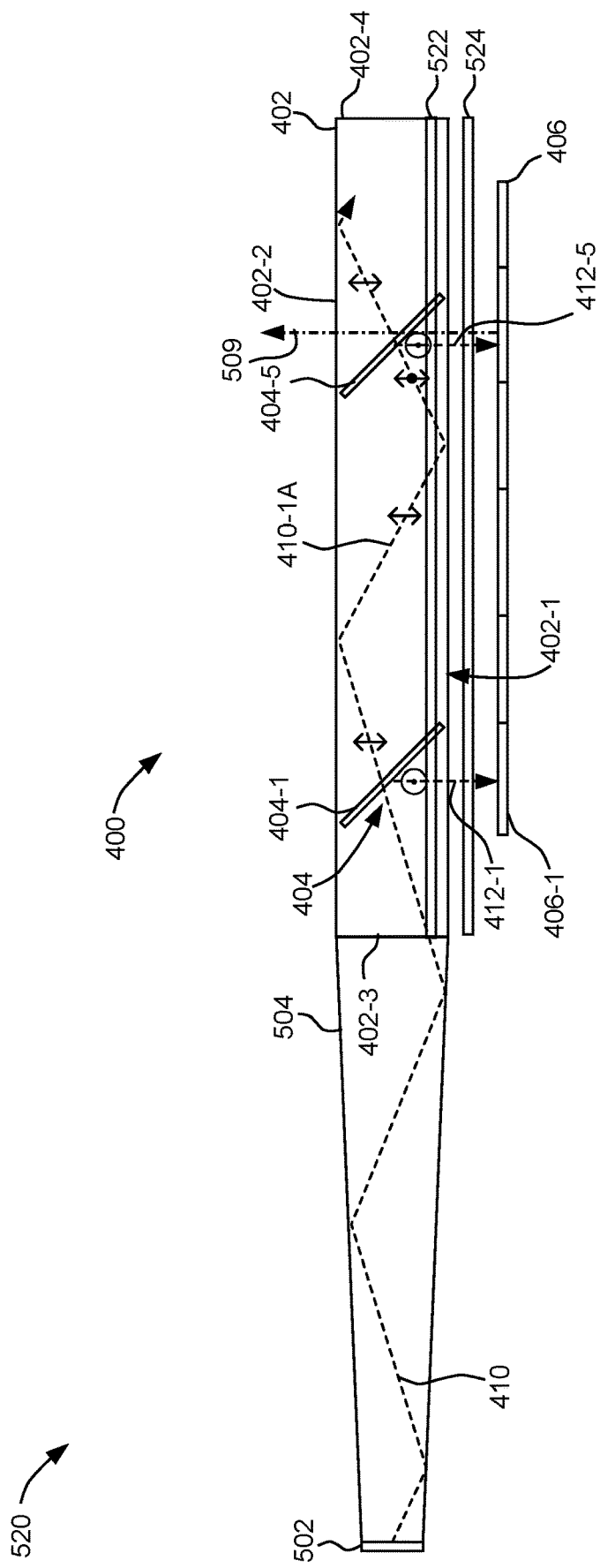
FIG. 5C is a schematic diagram illustrating an optical device for providing illumination light in accordance with some embodiments.

FIG. 5C is a schematic diagram illustrating display device 520 in accordance with some embodiments. Display device 520 is similar to display device 500 except that display device 520 includes retarder plate 522 (e.g., a half-wave plate, a quarter-wave plate, etc.) and some other components (e.g., retarder plates 404-2, 404-3, 404-4, and 404-6) are omitted so as not to obscure other aspects of display device 520. In some retarder plate 522 receives portion 410-1A of light 410 that has been transmitted by reflective polarizer 404-1. Portion 410-1A of light 410 has a first linear polarization that reflective polarizers 404 are configured to transmit instead of a second linear polarization that reflective polarizers 404 are configured to redirect. Retarder 522 converts polarization of portion 410-1A of light 410 to a third polarization that is distinct from the first linear polarization when portion 410-1A of light 410 is transmitted twice through retarder plate 522. Portion 410-1A of light 410 impinging on reflective polarizer 404-5 therefore has the third polarization (which has a component parallel to the second linear polarization) and reflective polarizer 404-5 is configured to redirect portion 412-5 of the impinging light that corresponds to a component of portion 410-1A parallel to the second linear polarization toward spatial light modulator 406.

In some embodiments, display device 520 further includes compensator 524 (e.g., a half-wave plate) disposed between surface 402-1 of waveguide 402 and spatial light modulator 406. In some embodiments, compensator 524 is configured to convert polarization of portion 412-5 of light 410 from waveguide beam splitter 400 such that a particular polarization (e.g., p-polarization or s-polarization instead of a diagonal polarization or an elliptical polarization) of light impinges on spatial light modulator 406. In some embodiments, compensator 524 is configured to convert polarization of image light (e.g., image light 509) from spatial light modulator 406 such that the image light is transmitted through reflective polarizers 404.

Figure 6A:
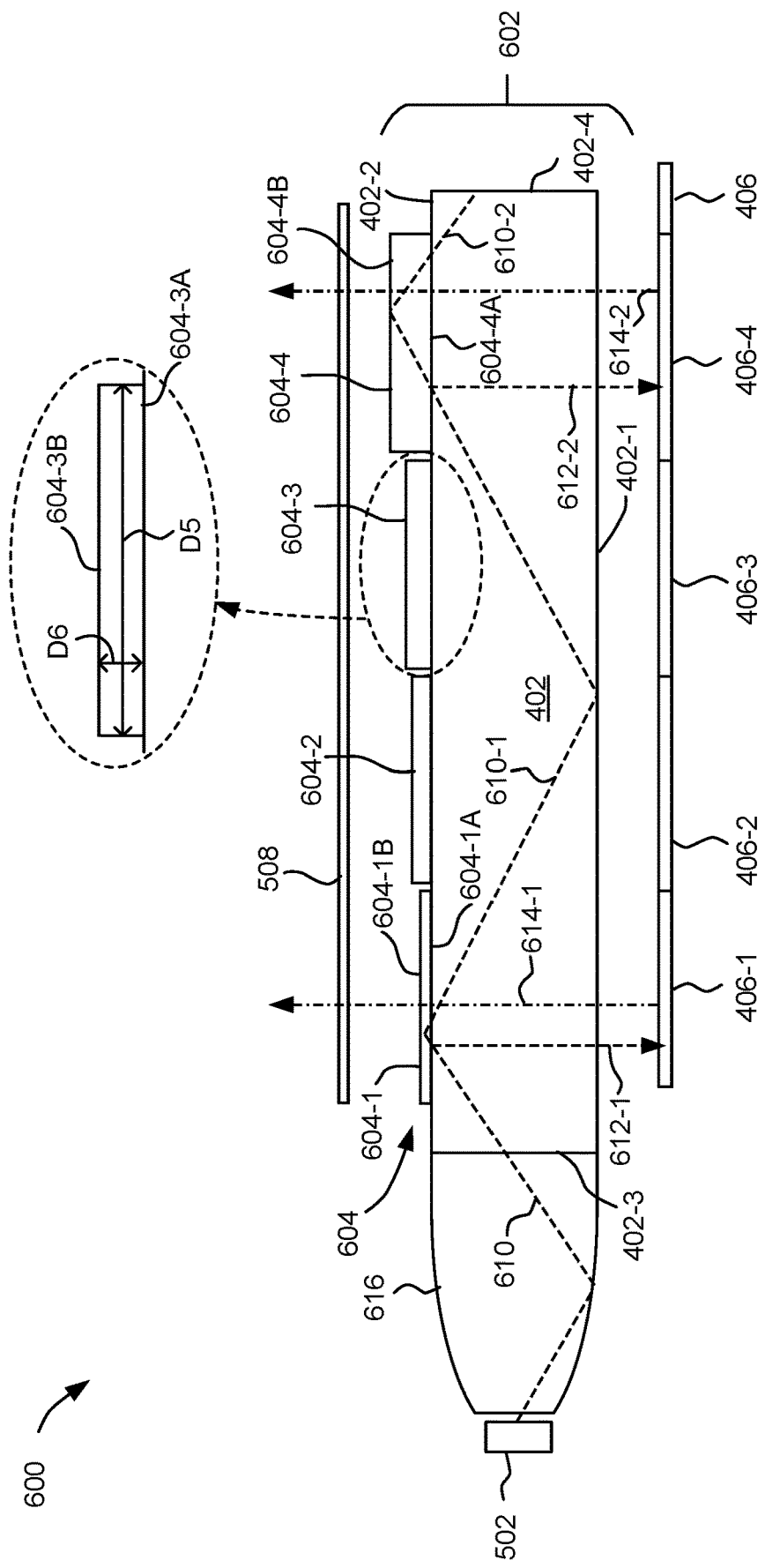
FIG. 6A is a schematic diagram illustrating an optical device for providing illumination light in accordance with some embodiments.

FIG. 6A is a schematic diagram illustrating display device 600 in accordance with some embodiments. Display device 600 is similar to display device 500 except that display device 600 includes waveguide beam splitter 602. Waveguide beam splitter 602 includes waveguide 402 and two or more polarization selective elements 604 (e.g., polarization selective elements 604-1, 604-2, 604-3, and 604-4).

In some embodiments, polarization selective elements 604 redirect (e.g., diffract or reflect) light having a first polarization (e.g., a first circular polarization) and transmit light having a second polarization distinct from the first polarization (e.g., a second circular polarization orthogonal to the first circular polarization).

In some embodiments, polarization selective elements 604 are liquid crystal based polarization selective elements, polarization selective elements including metasurfaces, polarization selective elements including resonant structured surfaces, polarization selective elements including continuous chiral layers, or polarization selective elements including birefringent materials. For example, a polarization selective element including a continuous chiral layer can be selective on circularly polarized light (e.g., redirects light having a particular circular polarization while transmitting light having polarization distinct from the particular circular polarization). In another example, a polarization selective element including a metasurface or resonant structures can be selective either on linearly polarized light or circularly polarized light (e.g., redirects light having a particular circular polarization or a particular linear polarization while transmitting light with polarization distinct from the particular circular polarization or the particular linear polarization).

In some embodiments, polarization selective elements 604 are polarization volume hologram (PVH) gratings or cholesteric liquid crystal (CLC) gratings. A PVH grating is selective with respect to polarization handedness, an incident angle, and/or a wavelength range of light incident thereon. In some embodiments, a PVH grating may transmit light having a first circular polarization without changing its direction or polarization (regardless of its incident angle or wavelength) and redirect (e.g., diffract or deflect) light having a second circular polarization (e.g., orthogonal to the first circular polarization), an incident angle within a particular range of incident angles, and a wavelength within a particular range of wavelengths while converting the polarization of the redirected light to the first circular polarization (e.g., the first circular polarization corresponds to right-handed circular polarization and the second circular polarization corresponds to left-handed circular polarization, or vice versa). In some configurations, the PVH grating does not transmit a substantial portion (e.g., redirects more than 80%, 90%, 95%, or 99% and transmits less than 20%, 10%, 5%, or 1%) of light having the second circular polarization that is within the particular range of incident angles and within the particular range of wavelengths. In some embodiments, the PVH grating transmits light having an incident angle outside the particular range of incident angles (regardless of its polarization or wavelength). Similar to a PVH, a CLC grating is selective with respect to polarization handedness, an incident angle, and/or a wavelength range of light incident thereon. For example, a CLC grating may transmit light having a first circular polarization without changing its direction or polarization and redirect (e.g., diffract or deflect) light having a second circular polarization that is orthogonal to the first circular polarization while converting the polarization of the redirected light to the first circular polarization. Structural features of PVH gratings and CLC gratings are described with respect to FIGS. 7A-7D.

In FIG. 6A, polarization selective elements 604 are configured as reflective gratings. In some embodiments, polarization selective elements 604 are disposed adjacent to surface 402-2 of waveguide 402. For example, in FIG. 6A, polarization selective elements 604 are in direct contact with surface 402-2 of waveguide 402. In some embodiments, polarization selective elements 604 are at least partially embedded inside waveguide 402. As shown, polarization selective element 604-1 receives light 610 from light source 502 propagating inside waveguide 402 in a first direction at a first surface 604-1A of polarization selective element 604-1. Polarization selective element 604-1 redirects (e.g., deflects) portion 612-1 of light 610 having the first polarization (e.g., a first circular polarization) in a second direction toward spatial light modulator 406. Portion 612-1 of light 610 thereby illuminates region 406-1 of spatial light modulator 406. Portion 610-1 of light 610 having the second polarization (e.g., a second circular polarization) is transmitted by polarization selective element 604-1 such that portion 610-1 of light 610 undergoes internal reflection at a second surface 604-1B of polarization selective element 604-1. The second surface 604-1B of polarization selective element 604-1 is opposite to the first surface 604-1A of polarization selective element 604-1. Portion 610-1 of light 610 is further received by a first surface 604-4A of polarization selective element 604-4. Polarization selective element 604-4 redirects portion 612-2 of light 610 having the first polarization in the second direction toward spatial light modulator 406. Portion 612-2 of light 610 thereby illuminates region 406-4 of spatial light modulator 406. Portion 610-2 of light 610 having the second polarization is transmitted by polarization selective element 604-4 such that portion 610-2 of light 610 undergoes internal reflection at a second surface 604-4B of polarization selective element 604-2 and continues to propagate inside waveguide 402.

In some embodiments, a respective polarization selective element 604 has width D5, as shown in the inset of FIG. 6A. In some configurations, D5 corresponds to a width of a corresponding region of spatial light modulator 406. For example, width D5 of polarization selective element 604-3 corresponds to a width of region 406-3 of spatial light modulator 406. Polarization selective elements 604 may have a uniform width or different widths. For example, polarization selective elements 604-1, 604-2, 604-3, and 604-4 may all have a same width or they may have distinct widths.

In some embodiments, polarization selective elements 604 are configured to have distinct reflectivities, as described above with respect to reflective polarizers 404. For example, in some configurations, polarization selective element 604-2 has a greater reflectivity than polarization selective element 604-1, and polarization selective element 604-3 has a greater reflectivity than polarization selective element 604-2, etc. In some embodiments, reflectivity of a polarization selective element is determined based at least in part on a thickness of the polarization selective element. For example, the reflectivity may be directly proportional to the thickness of the polarization selective element. A thickness of a polarization selective grating is a distance between a first surface and a second surface of the polarization selective grating (e.g., thickness D6 of polarization selective element 604-3 in the inset of FIG. 6A is defined by the distance between the first surface 604-3A and the second surface 604-3B). In FIG. 6A, polarization selective elements 604 have distinct thicknesses. For example, polarization selective element 604-1 has a first thickness, polarization selective element 604-2 has a second thickness greater than the first thickness, polarization selective element 604-3 has a third thickness greater than the second thickness, and polarization selective element 604-4 has a fourth thickness greater than the third thickness. Accordingly, polarization selective element 604-1 has a first reflectivity (e.g., ⅙), polarization selective element 604-1 has a second reflectivity (e.g., ⅕), polarization selective element 604-3 has a third reflectivity (e.g., ¼), and polarization selective element 604-4 has a fourth reflectivity (e.g., ⅓). In some embodiments, the reflectivity of a polarization selective element is determined also based on a duty cycle of a polarization selective grating. In some cases, a duty cycle of a polarization selective grating is defined as a ratio of a width of a grating ridge and a grating period.

In some embodiments, optical device 600 also includes compound parabolic concentrator 616 positioned between light source 502 and waveguide beam splitter 602. Compound parabolic concentrator 616 is configured to receive light 610 output by light source 502 and guide light 610 into waveguide 402. In some embodiments, compound parabolic concentrator 616 has a reflective surface (e.g., a parabolic reflective surface) configured to condense divergence of light 610. In some embodiments, compound parabolic concentrator 616 and waveguide 402 are integrated to form a single optical component, excluding end surface 402-3 of waveguide 402. In some embodiments, optical device 600 includes tapered light guide 504 or a lens, described with respect to FIG. 5A, instead of compound parabolic concentrator 616.

In some embodiments, polarization selective elements 604 are switchable between different states, such as a first state and a second state. For example, polarization selective elements 604 are switchable CLC gratings. In some embodiments, a switchable CLC grating can be switched between distinct states by altering a voltage applied across the switchable CLC grating. For example, while a voltage is applied across the CLC grating, the CLC grating is in a first state and liquid crystals of the CLC grating are in a homeotropic configuration. In a homeotropic configuration, liquid crystals having a rod-like shape align parallel to an electric field created by the applied voltage. While the voltage applied to the switchable CLC is turned off, the CLC grating is in a second state and the liquid crystals of the CLC grating form cholesteric liquid crystals aligned in accordance with a photoalignment layer of the CLC grating. While in the first state, the CLC grating operates as a plain substrate (without diffracting an incident light or changing polarization of the indecent light). While in the second state, the CLC grating operates as a polarization selective grating as described above with respect to polarization selective gratings 604. The switchable gratings can be used for selectively illuminating distinct regions of spatial light modulator 406. For example, in one instance, polarization selective element 604-1 is in the first state thereby forgoing illumination of region 406-1 of spatial light modulator 406 and polarization selective element 604-4 is in the second state thereby illuminating region 406-4 of spatial light modulator 406 (e.g., at least with portion 614-2 of light 610). Thus, the switchable polarization selective elements allow zonal illumination of spatial light modulator 406, thereby eliminating illumination of portions of spatial light modulator 406 that do not need to be illuminated (e.g., based on the content of the image, such as a black background). This, in turn, improves the image quality (e.g., by improving the contrast), reduces energy usage (e.g., allows a temporal dimming of the light source), and/or increases the brightness of the image.

Figure 6B:
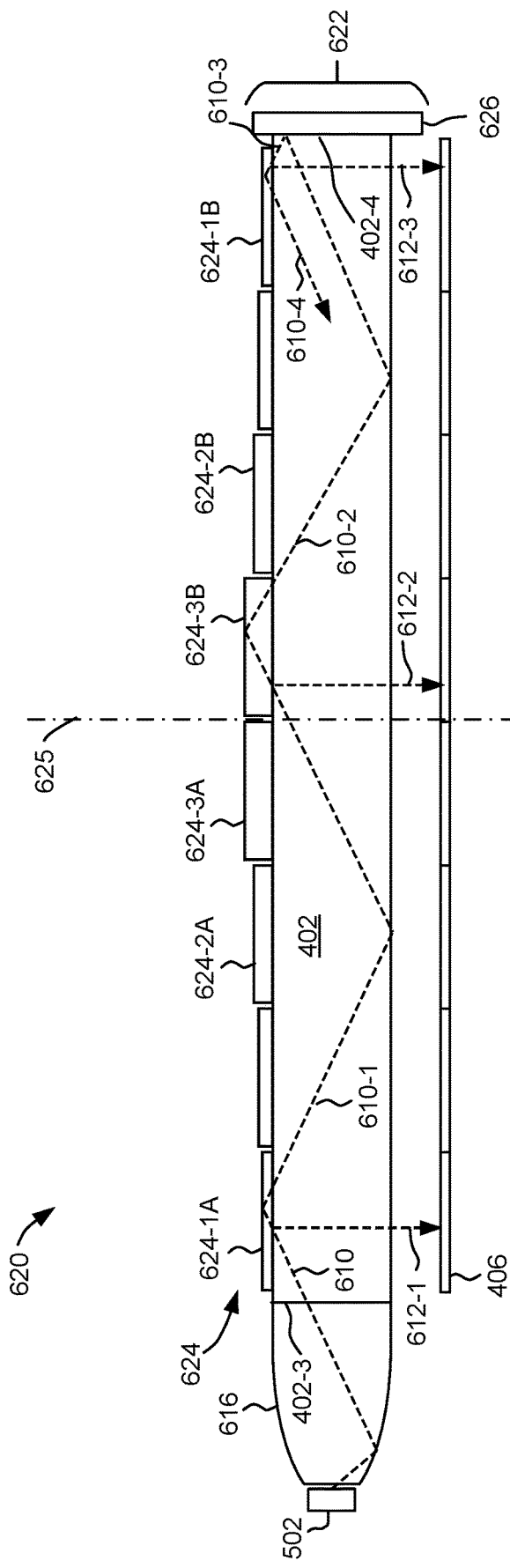
FIG. 6B is a schematic diagram illustrating an optical device for providing illumination light in accordance with some embodiments.

FIG. 6B is a schematic diagram illustrating display device 620 in accordance with some embodiments. Display device 620 is similar to display device 600 in FIG. 6A expect that display device 620 includes waveguide beam splitter 622 having polarization selective elements 624 and reflector assembly 626. Waveguide beam splitter 622 is configured to recycle light impinging on end surface 402-4 of waveguide 402 to continue travelling inside waveguide 402. Reflector assembly 626 is positioned adjacent to end surface 402-4 of waveguide 402. In some embodiments, reflector assembly 626 is positioned in direct contact with end surface 402-4. Reflector assembly 626 receives light propagating inside waveguide 402 (e.g., portion 610-2 of light 610 reaching end surface 402-4) and reflects at least a portion of the light back into waveguide 402 such that the at least a portion of the light (e.g., portion 610-3 continues to propagate inside waveguide 402. While reflecting the at least a portion of the light, reflective assembly 626 maintains the polarization of the light. In instances where portion 610-2 of light 610 is linearly polarized, reflector assembly 626 includes a reflector (e.g., a mirror). In instances where portion 610-2 of light 610 is circularly polarized, reflector assembly 626 includes one or more PVH gratings for reflecting circularly polarized light while maintaining its handedness. Alternatively, in some embodiments, reflector assembly 626 includes a combination of a reflector (e.g., a mirror) and a polarization retarder (e.g., a quarter-wave plate) for reflecting circularly polarized light while maintaining its handedness. As shown, portion 610-3 of light 610 reflected by reflector assembly 626 is received by polarization selective element 624-1B, which redirects portion 612-3 toward spatial light modulator 406 (depending on the state polarization selective element 624-1B is in) while portion 610-4 undergoes internal reflection to continuing to propagate inside waveguide 402.

Because of the light recycling, an intensity of light impinging on polarization selective elements is increased (compared to a configuration without reflector assembly 626). In particular, an intensity of light impinging on polarization selective elements in vicinity of reflector assembly 626 (e.g., polarization selective element 624-1B) is increased further than polarization selective elements away from reflector assembly (e.g., polarization selective element 624-1A). Therefore, polarization selective elements 624 are configured based on the total intensity of light impinging on polarization selective elements 624 to provide uniform illumination on spatial light modulator 406. For example, because an intensity of light impinging on polarization selective elements 624 positioned near reflector assembly 626 may be higher than the intensity of light impinging on polarization selective elements near the middle of display device 620 (e.g., polarization selective elements 624-3A and 624-3B), polarization selective elements positioned near reflector assembly 626, such as element 624-1B, have a lower reflectivity than polarization selective elements positioned near a geometric center of polarization selective elements 624 (e.g., reference line 625 represents the geometric center of polarization selective elements 624). For similar reasons, polarization selective element 624-1B positioned located closes to reflector assembly 626 has a lower reflectivity than polarization selective element 624-2B. Polarization selective element 624-2B has a lower reflectivity than polarization selective element 624-3B. In some embodiments, polarization selective elements 624 are configured to have symmetric reflectivity properties such that polarization selective elements 624-1A and 624-1B (located on opposite sides of reference line 625) have a first reflectivity, polarization selective elements 624-2A and polarization selective elements 624-2B (located on opposite sides of reference line 625) have a second reflectivity greater than the first reflectivity, and polarization selective elements 624-3A and polarization selective elements 624-3B (located on opposite sides of reference line 625) have a third reflectivity greater than the second reflectivity. In some embodiments, polarization selective elements 624-3A and 624-3B are positioned at a first distance from reference line 625, polarization selective elements 624-2A and 624-2B are positioned at a second distance greater than the first distance from reference line 625, and polarization selective elements 624-1A and 624-1B are positioned at third distance greater than the second distance from reference line 625. In some embodiments, polarization selective elements 624-1A and 624-1B are positioned at opposite ends of waveguide 402 (e.g., polarization selective element 624-1A is positioned near end surface 402-3 and polarization selective element 624-1B is positioned near end surface 402-4).

Figure 6C:
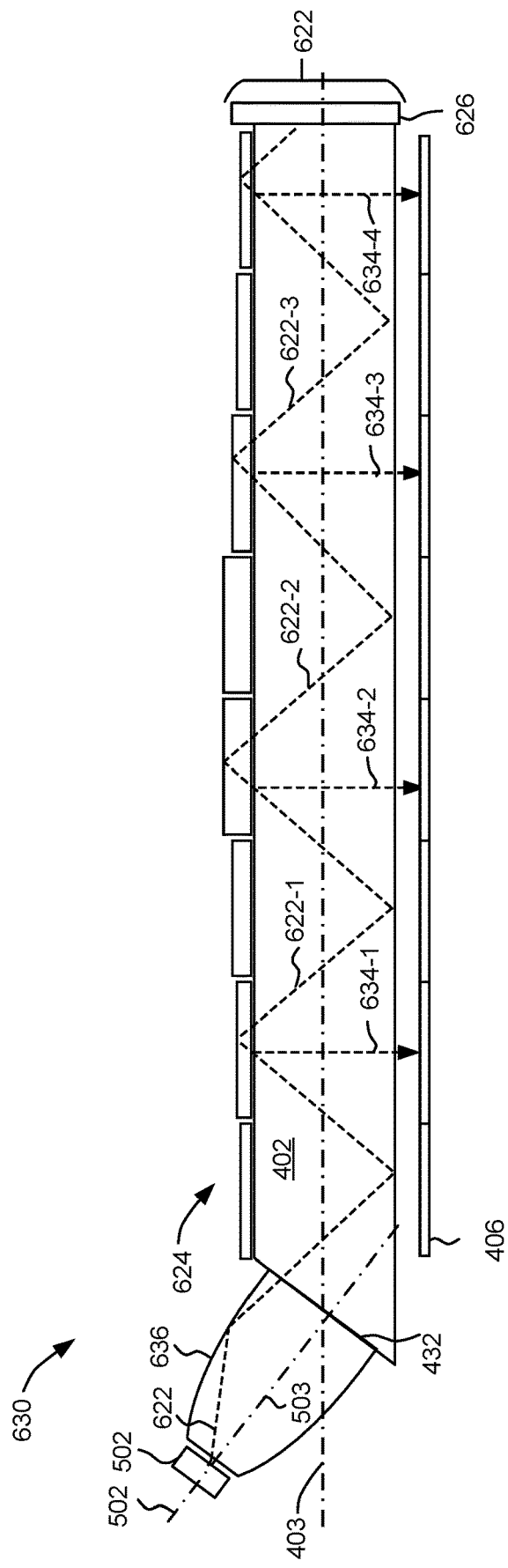
FIG. 6C is a schematic diagram illustrating an optical device for providing illumination light in accordance with some embodiments.

FIG. 6C is a schematic diagram illustrating display device 630 in accordance with some embodiments. Display device 630 is similar to display device 620 described with respect to FIG. 6B except that display device 630 includes compound parabolic concentrator 636 in a tilted configuration. As shown, waveguide 402 has a slanted end surface (e.g., end surface 432 of waveguide 402) optically coupled with compound parabolic concentrator 636. In some embodiments, compound parabolic concentrator 636 is in direct contact with the slanted end surface of waveguide 402. Therefore, optical axis 503 of light source 502 is tilted with respect to reference plane 403 of waveguide 402. In such a tilted configuration, light 632 from light source 502 is projected into waveguide 402 with a steeper angle (compared to reference plane 403). The steeper angle increases the number of internal reflections of light 632 within waveguide 402, thereby increasing a number of polarization selective elements 624 interacting with any particular ray of light. For example, with the tilted configuration shown in FIG. 6C, light 632 impinges on four polarization selective elements 624 while propagating from light source 502 to reflector assembly 626, which in turn enables outputting portions 634-1, 634-2, 634-3, 634-4 of light 632 toward spatial light modulator 406. In comparison, in FIG. 6B having a non-tilted configuration, light 610 impinges on two polarization selective elements 624 while propagating from light source 502 to reflector assembly 626, which enables outputting portions 612-1 and 612-2 of light 610 toward spatial light modulator 406. Thus, without using the tilted configuration, a wider divergence light source may be needed to cause light to interact with all of polarization selective elements 624. Although FIG. 6C illustrates a configuration with compound parabolic concentrator 636, a tilted waveguide or one or more lenses may be included instead of, or in addition to, compound parabolic concentrator 636. The tilted configuration illustrated in FIG. 6C could be applied to any of the display devices described with respect to FIGS. 5A-5C, 6A, 6B, 6D and 8.

Figure 6D:
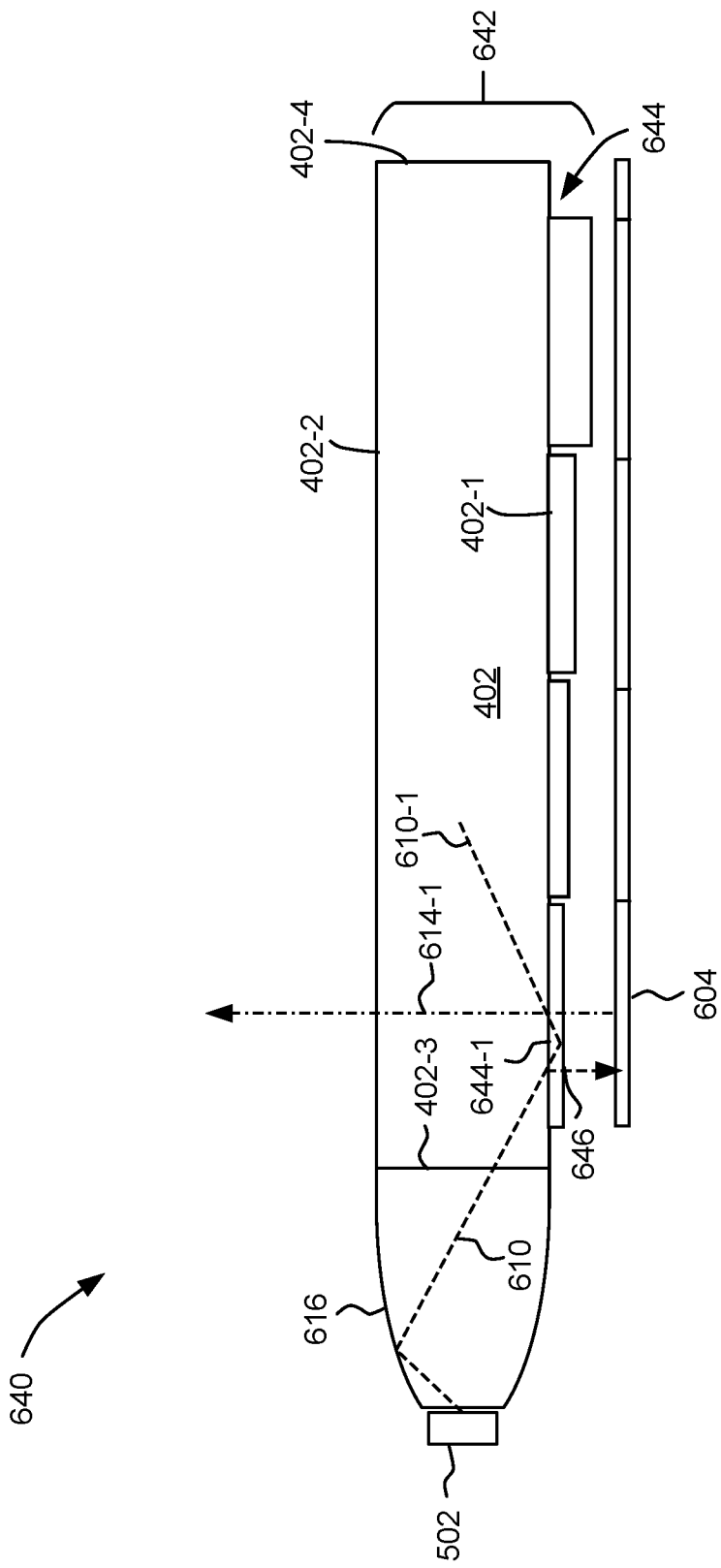
FIG. 6D is a schematic diagram illustrating an optical device for providing illumination light in accordance with some embodiments.

FIG. 6D is a schematic diagram illustrating display device 640 in accordance with some embodiments. Display device 640 is similar to display device 600 described with respect to FIG. 6A except that display device 640 includes waveguide beam splitter 642. Waveguide beam splitter 642 includes waveguide 402 coupled with transmission polarization selective elements 644 disposed adjacent to surface 402-1 of waveguide 402. In some embodiments, transmission polarization selective elements 644 are in direct contact with surface 402-1. In some embodiments, transmission polarization selective elements 644 are at least partially embedded inside waveguide 402. Transmission polarization selective elements 644 (e.g., transmission PVH or CLC gratings) are similar to polarization selective elements 604 but are configured to redirect light having the first circular polarization without reflecting the light. Instead, transmission polarization selective elements 644 redirect the light by diffraction (e.g., in a forward direction). As shown, transmission polarization selective element 644-1 receives light 610 and redirects portion 646 of light 610 (e.g., having a particular polarization) toward spatial light modulator 406. Portion 610-1 of light 610 (e.g., having a polarization orthogonal to the particular polarization) undergoes total internal reflection at a surface of transmission polarization selective element 644-1 thereby continuing to propagate inside waveguide 402.

Figure 7C:
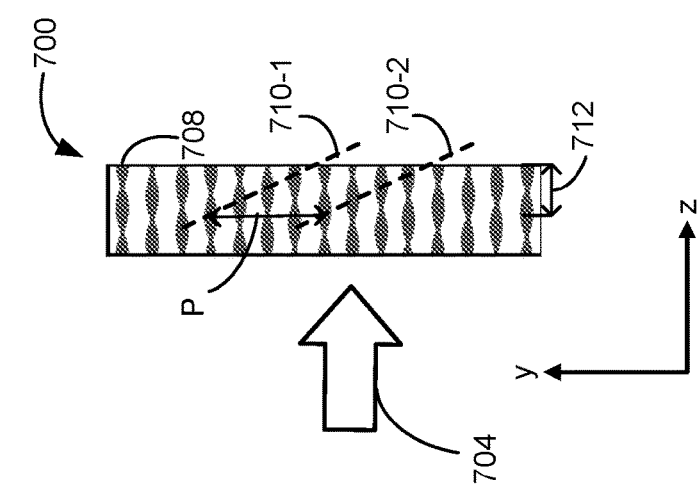
FIGS. 7A-7D are schematic diagrams illustrating a polarization volume hologram grating in accordance with some embodiments.
Figure 7B:
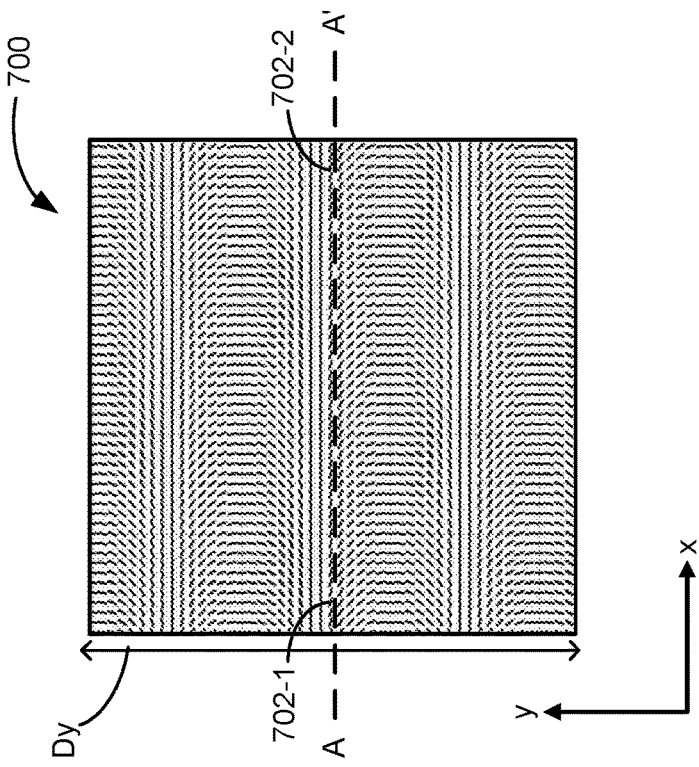
Figure 7A:
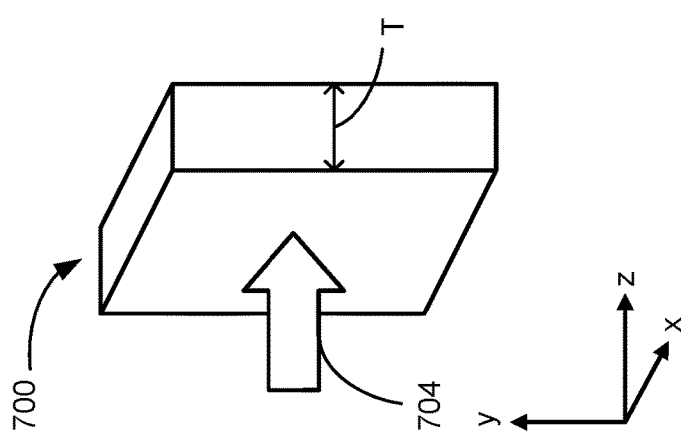
Figure 7D:
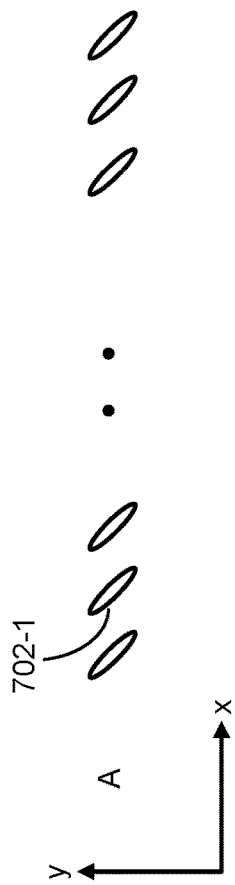

FIGS. 7A-7D are schematic diagrams illustrating polarization volume hologram (PVH) grating 700 in accordance with some embodiments. In some embodiments, PVH grating 700 (e.g., a reflective grating or a transmission grating) corresponds to polarization selective elements 604, 624, and 644 described with respect to FIGS. 6A-6D. FIG. 7A illustrates a three dimensional view of PVH grating 700 with incoming light 704 entering the grating along the z-axis. FIG. 7B illustrates an x-y-plane view of PVH grating 700 with a plurality of cholesteric liquid crystals (e.g., liquid crystals 702-1 and 702-2) with various orientations. The orientations of the liquid crystals are constant along reference line AA' along the x-axis, as shown in FIG. 7D illustrating a detailed plane view of the liquid crystals along the reference line. The orientations of the liquid crystals in FIG. 7B vary along the y-axis. The pitch defined as a distance along the y-axis at which an azimuth angle of a liquid crystal has rotated 180 degrees is constant throughout the grating. FIG. 7C illustrates a y-z-cross-sectional view of PVH grating 700. In FIG. 7C, PVH grating 700 has helical structures 708 with helical axes aligned corresponding to the z-axis. In some embodiments, the helical structures 708 have helical axes tilted with respect to the z-axis. The helical structures create a volume grating with a plurality of diffraction planes (e.g., planes 710-1 and 710-2) extending across the grating. In FIG. 7C, diffraction planes 710-1 and 710-2 are tilted with respect to the z-axis. Helical structures 708 define the polarization selectivity of PVH grating 700, as light having circular polarization with handedness corresponding to the helical axes is diffracted while light having circular polarization with the opposite handedness is not diffracted. Helical structures 708 also define the wavelength selectivity of PVH grating 700, as light with wavelength close to a helical pitch (e.g., helical pitch 712 in FIG. 7C) is diffracted while light with other wavelengths is not diffracted (or diffracted at a reduced efficiency).

In some embodiments, reflectivity of a PVH grating is dependent on a thickness (e.g., thickness T illustrated in FIG. 7A) and/or duty cycle of the grating. For example, a PVH grating with a greater thickness T may have a greater reflectivity. For example, a PVH grating with a greater duty cycle may have a greater reflectivity.

In some embodiments, polarization selective elements 604, 624, and 644 described with respect to FIGS. 6A-6C are cholesteric liquid crystal (CLC) gratings. A CLC grating (e.g., a reflective grating or a transmission grating) has similar optical properties to those described with respect to PVH grating 700. A CLC grating and a PVH grating both include cholesteric liquid crystals in helical arrangements. A CLC grating further includes a photoalignment layer and the CLCs are arranged in helical structures in accordance with the photoalignment layer (e.g., the photoalignment layer has alignment patterns corresponding to the orientation of the liquid crystals shown in FIG. 7B). In contrast, in a PVH grating, liquid crystals are arranged in helical structures based on holographic recording. In some embodiments, CLC gratings are switchable, e.g., by altering an applied voltage, between different states. While in a first state, a CLC grating operates as a substrate (without redirecting or changing polarization of indecent light). While in a second state, the CLC grating operates as a diffraction grating. As described above with respect to FIG. 6A, the switchable gratings can be used for selectively illuminating distinct regions of spatial light modulator 406.

Figure 8:
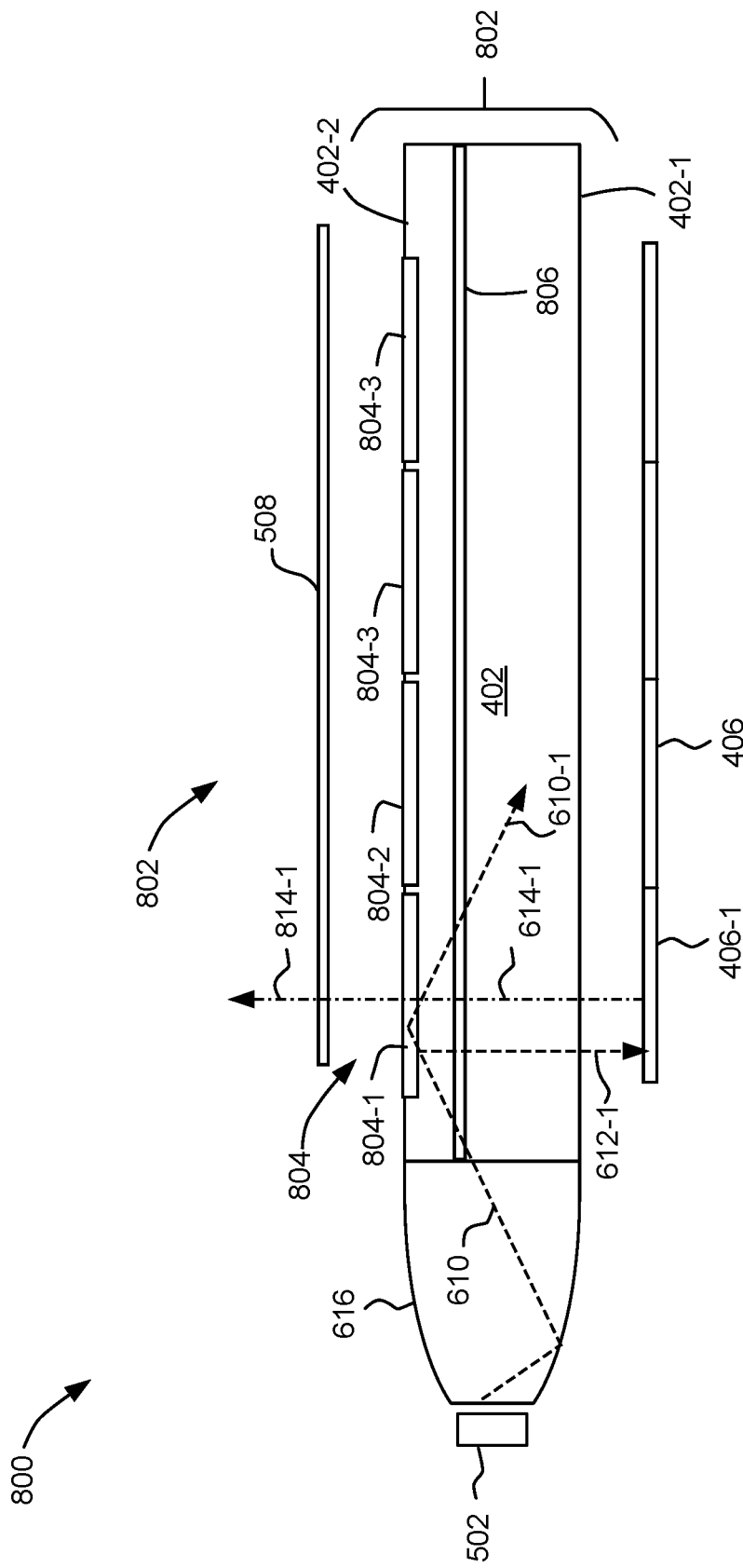
FIG. 8 is a schematic diagram illustrating an optical device for providing illumination light in accordance with some embodiments.

FIG. 8 is a schematic diagram illustrating display device 800 in accordance with some embodiments. Display device 800 is similar to display device 600 described above with respect to FIG. 6A except that display device 800 includes waveguide beam splitter 802 including waveguide 402 and extraction features 804 (e.g., extraction features 804-1, 804-2, 804-3, and 804-4). In FIG. 8, extraction features 804 are embedded inside waveguide 402 such that extraction features 804 are located between surfaces 402-1 and 402-2 of waveguide 402, adjacent to surface 402-2. Alternatively, in some embodiments, extraction features 804 are located adjacent to surface 402-2 facing polarizer 508. In some embodiments, extraction features 804 are in direct contact with surface 402-1 or surface 402-2.

Different types of extraction features 804 are described below with respect to FIGS. 9A-9B. An extraction feature is configured to redirect a first portion of light impinging on the extraction feature (e.g., portion 612-1 of light 610) toward a respective region of spatial light modulator 406. A second portion of the light undergoes internal reflection for continuing to propagate inside waveguide 402 (e.g., portion 610-1 of light 610). As described above with respect to polarization selective elements 604, extraction features 804 have reflectivities selected so that portions of light redirected to illuminate spatial light modulator 406 have equal (or substantially equal) intensities. For example, extraction feature 804-1 has a first reflectivity (e.g., reflectivity ⅙), extraction feature 804-2 has a second reflectivity (e.g., reflectivity ⅕), extraction feature 804-3 has a third reflectivity (e.g., reflectivity ¼), and extraction feature 804-4 has a fourth reflectivity (e.g., reflectivity ⅓). In some embodiments, extraction features 804 are polarization selective (e.g., holographic optical element (HOE) extraction feature 900 described with respect to FIG. 9A). Such polarization selective extraction features 804 can be selective with respect to the polarization of circularly or linearly polarized light. In some embodiments, waveguide beam splitter 802 further includes retarder plate 806 positioned between surfaces 402-1 and 402-2 of waveguide 402 (e.g., retarder plate 806 is embedded inside waveguide 402). Retarder plate 806 is configured to convert polarization of light propagating inside waveguide 402 (e.g., portion 610-1 of light 610) in order to convert polarization of light impinging on extraction features 804 (e.g., rotates p-polarized or s-polarized light to a diagonally polarized light). In some embodiments, extraction features 804 are not polarization selective. In such instances, extraction features 804 may be configured to receive image light 614-1 from spatial light modulator 406 and transmit only a portion of image light 614-1 (e.g., portion 814-1 of image light 614-1). Alternatively, extraction features 804 may be angle-dependent, and thus, receive image light 614-1 from spatial light modulator 406 and transmit a substantial portion of the image light 614-1 from spatial light modulator 406.

Figure 9A:
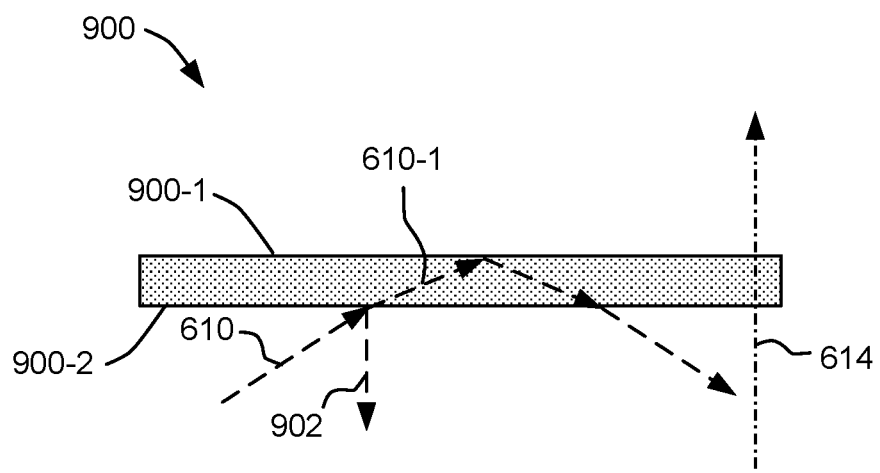
FIG. 9A is a schematic diagram illustrating a holographic optical element (HOE) extraction feature in accordance with some embodiments.

FIG. 9A is a schematic diagram illustrating holographic optical element (HOE) extraction feature 900 in accordance with some embodiments. An HOE includes a recordable medium that is patterned by a holographic imaging method based on optical interference. HOEs can be patterned to have distinct reflectivities by varying a thickness, opacity and/or density of the recordable medium. An HOE pattern may be recorded such that the HOE redirects (e.g., reflects or diffracts) light received in a particular incident angle range while transmitting light having an incident angle outside the particular incident angle range (without changing its direction). In FIG. 9A, HOE extraction feature 900 is a reflective extraction feature (e.g., similar to extraction features 804 in FIG. 8A positioned on surface 402-2 of waveguide 402). As shown, HOE extraction feature 900 receives light 610 and redirects portion 902 of light 610 toward a spatial light modulator (e.g., spatial light modulator 406 in FIG. 8). Portion 610-1 of light 610 undergoes internal reflection at surface 900-1 of HOE extraction feature 900 so that portion 610-1 continues to propagate inside a waveguide (e.g., waveguide 402 in FIG. 8). HOE extraction feature 900 is configured to selectively redirect light having an incident angle within a particular incident angle range while transmitting light having an incident angle outside the particular incident angle range. Therefore, image light 614 projected by a spatial light modulator having an incident angle distinct outside the particular incident angle range is transmitted through HOE extraction feature 900. In some embodiments, HOE extraction feature 900 is configured as a transmission extraction feature (e.g., similar to polarization selective elements 644 in FIG. 6D disposed on surface 402-1 of waveguide 402).

Figure 9B:
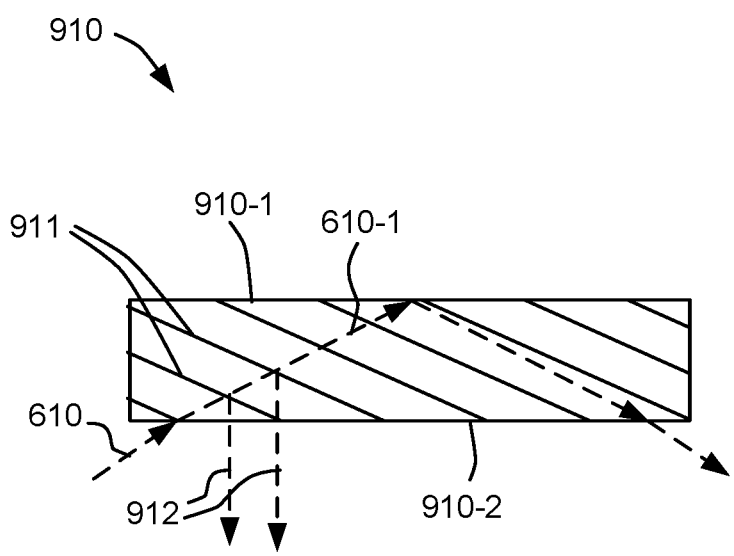
FIG. 9B is a schematic diagram illustrating a volume Bragg grating (VBG) extraction feature in accordance with some embodiments.

FIG. 9B is a schematic diagram illustrating volume Bragg grating (VBG) extraction feature 910 in accordance with some embodiments. A VBG (also called a volume holographic grating) includes a transparent medium recorded with a grating pattern that occupies a volume of the grating. In some embodiments, similar to an HOE, a VBG is also patterned using holographic imaging method based on optical interference. VBGs can be configured to have distinct reflectivities depending on thicknesses and/or duty cycles of the VBGs. In some embodiments, a VBG is selective with respect to an incident angle and/or wavelength of an incident light. A VBG may be a reflective or a transmission grating, as described above with respect to HOE extraction feature 900. In FIG. 9B, VBG extraction feature 910 is a reflective extraction feature (e.g., similar to extraction features 804 in FIG. 8 positioned on surface 402-2 of waveguide 402). As shown, surface 910-2 of VBG extraction feature 910 receives light 610. Light 610 is redirected as light 610 impinges on diffraction planes 911 of VBG extraction feature 910 such that portion 912 of light 610 is redirected toward a spatial light modulator (e.g., spatial light modulator 406 in FIG. 8). Portion 610-1 of light 610 undergoes internal reflection at surface 910-1 of VBG extraction feature 910 so that portion 610-1 continues to propagate inside the waveguide (e.g., waveguide 402 in FIG. 8). VBG extraction feature 910 is configured to selectively redirect light having an incident angle within a particular incident angle range while transmitting light having an incident angle outside the particular incident angle range. The particular incident angle range is defined by a tilt angle defined by diffraction planes 911 and a normal to surfaces 910-1 and 910-2. Image light 614 projected by a spatial light modulator having an incident angle outside the particular incident angle range is transmitted through VBG extraction feature 910. In some embodiments, VBG extraction feature 910 is a transmission extraction feature (e.g., similar to polarization selective elements 644 in FIG. 6D disposed on surface 402-1 of waveguide 402).

In some embodiments, VBG extraction features 910 are switchable between distinct states. For example, VBG extraction features 910 are electronically switchable Bragg gratings (e.g., an electronically switchable Bragg grating including liquid crystals). In some embodiments, a switchable VBG extraction feature can be switched between distinct states by altering a voltage applied across the switchable VBG extraction feature. For example, while in a first state, a voltage is applied across the VBG extraction feature and liquid crystals of the VBG extraction feature are in a homeotropic configuration (e.g., liquid crystals having a rod-like shape align parallel to an electric field created by the applied voltage). In a second state, the voltage is turned off and the liquid crystals of the VBG extraction feature are oriented randomly. While in the first state, the VBG extraction feature operates as a substrate (without diffracting an incident light or changing polarization of the indecent light). While in the second state, the VBG extraction feature operates as a diffraction grating. The switchable gratings can be used for selectively illuminating distinct regions of spatial light modulator 406.

Figure 9C:
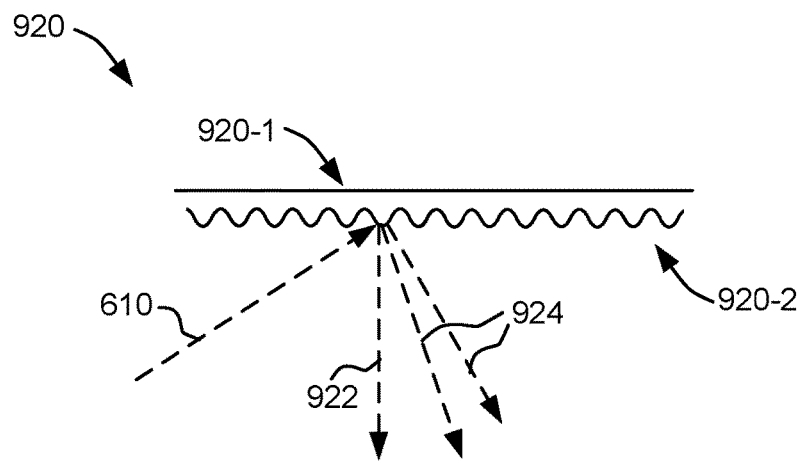
FIG. 9C is a schematic diagram illustrating a surface relief grating (SRG) extraction feature in accordance with some embodiments.

FIG. 9C is a schematic diagram illustrating surface relief grating (SRG) extraction feature 920 in accordance with some embodiments. In some embodiments, SRG extraction feature 920 includes flat surface 920-1 and grating surface 920-2 (e.g., a surface having alternating regions of different thicknesses, such as peaks and valleys). In some embodiments, SRG extraction feature 920 is configured to have distinct reflectivities based on a duty cycle of the SRG. In some embodiments, SRG extraction feature 920 is positioned so that flat surface 920-1 is in direct contact with a surface of a waveguide (e.g., surface 402-2 of waveguide 402 in FIG. 8). Grating surface 920-2 is configured to receive light 610 and SRG extraction 920 feature diffracts at least a portion of light 610 to distinct directions (e.g., to directions corresponding to a first, second, third, etc. order of diffraction). In some embodiments, grating surface 920-2 diffracts portion 922 of light 610 in a first direction toward a spatial light modulator (e.g., spatial light modulator 406 in FIG. 8), and diffract portions 924 of light 610 in directions distinct from the first direction. In some embodiments, portions 924 impinge on an opposing surface of the waveguide (e.g., surface 402-1 of waveguide 402) and undergo an internal reflection so that portions 924 of light 610 continue to propagate inside the waveguide. In some embodiments, SRG extraction feature 920 has two opposing grating surfaces (e.g., surface 920-1 is replaced with a grating surface).

Figure 9D:
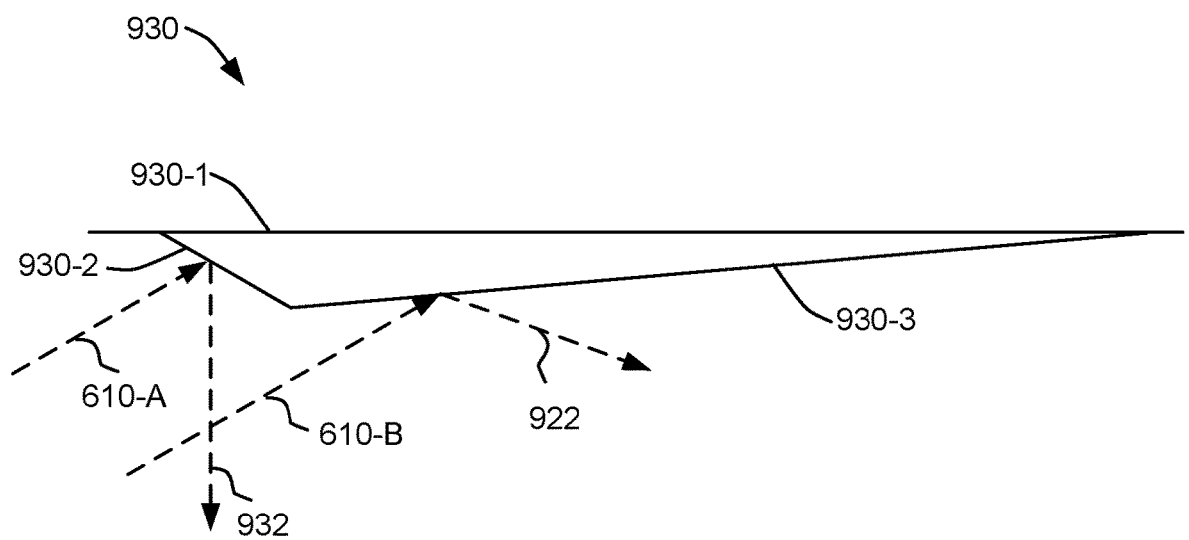
FIG. 9D is a schematic diagram illustrating a Fresnel extraction feature in accordance with some embodiments.

FIG. 9D is a schematic diagram illustrating Fresnel extraction feature 930 (e.g., a Fresnel reflector) in accordance with some embodiments. Fresnel extraction feature 930 includes at least base facet 930-1, draft facet 930-2, and slope facet 930-3. In some embodiments, one or both of slope facet 930-3 and draft facet 930-2 include a partially reflective surface (e.g., a partially reflective coating). In some embodiments, Fresnel extraction feature 930 is positioned so that base facet 930-1 is in direct contact with a surface of a waveguide (e.g., surface 402-2 of waveguide 402 in FIG. 8). As shown, draft facet 930-2 receives portion 610-A of light 610 and redirects at least a portion of the light as portion 932 of light 610 in a first direction toward an spatial light modulator (e.g., spatial light modulator 406 in FIG. 8). Slope facet 930-3 receives portion 610-B of light 610 and redirects (e.g., by reflection) at least a portion of the light as portion 922 of light 610 in a second direction that is distinct from the first direction. In some embodiments, portion 922 of light 610 impinges on an opposing surface on the waveguide (e.g., surface 402-1 of waveguide 402) and undergoes an internal reflection so that portion 922 of light 610 continues to propagate inside the waveguide. In some embodiments, reflectivity of Fresnel extraction feature 930 is determined by a slope angle (e.g., an angle defined by base facet 930-1 and slope facet 930-3) of Fresnel extraction feature 930.

Figure 10A:
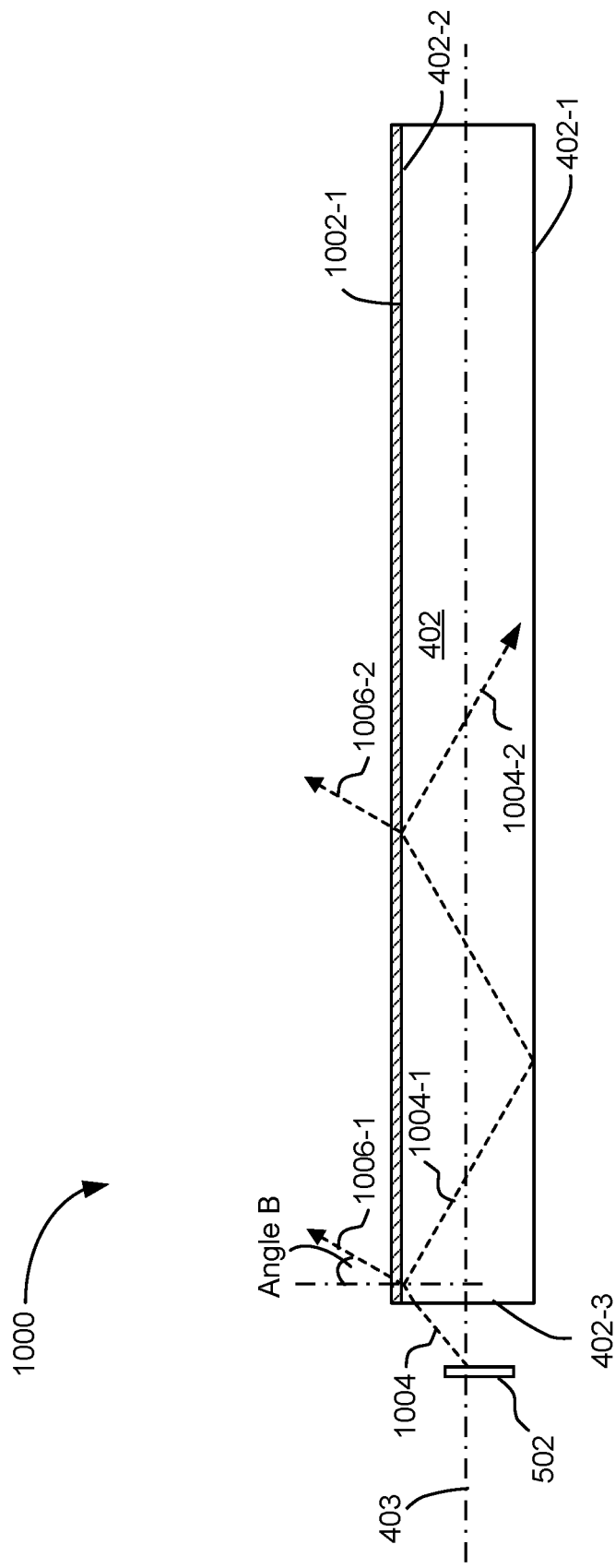
FIG. 10A is a schematic diagram illustrating an optical device for providing illumination light in accordance with some embodiments.
Figure 10B:
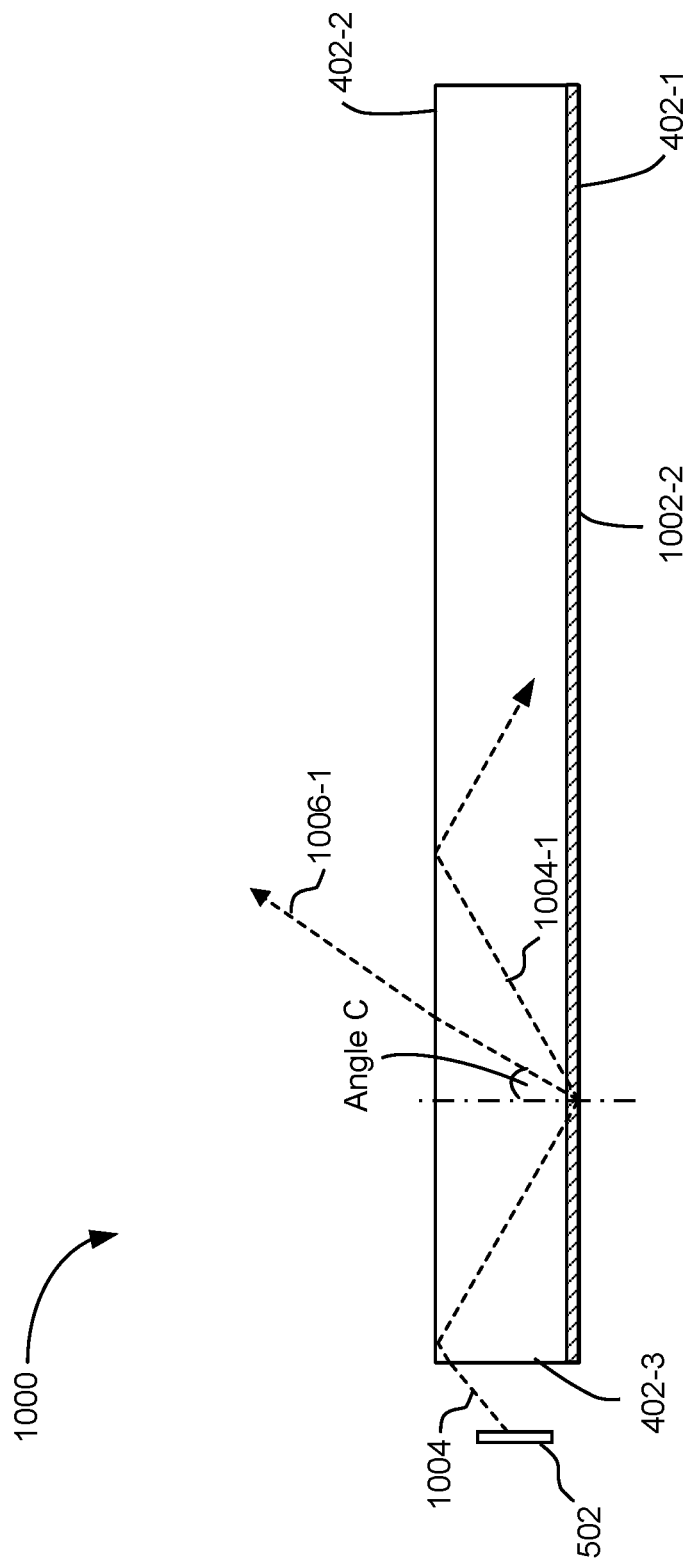
FIG. 10B is a schematic diagram illustrating an optical device for providing illumination light in accordance with some embodiments.

FIGS. 10A and 10B are schematic diagrams illustrating waveguide beam splitter 1000 in accordance with some embodiments. Waveguide beam splitter 1000 includes waveguide 402 and output coupler 1002-1. In some embodiments, output coupler 1002-1 is positioned adjacent to surface 402-2 of waveguide 402. In some embodiments, output coupler 1002-1 is positioned on surface 402-2 of waveguide 402 such that output coupler 1002-1 is in direct contact with surface 402-2, as shown in FIG. 10A. In some embodiments, output coupler 1002-1 is at least partially embedded inside waveguide 402.

In some embodiments, output coupler 1002-1 is a turning film (also known as a direction turning film or a light turning film). In some embodiments, a turning film is an optical film configured to redirect (e.g., shift) incident light by a particular angle. In some embodiments, the particular angle ranges between 10 and 40 degrees, between 15 and 35 degrees, or between 20 and 30 degrees. In some embodiments, a turning film is configured to change a direction of light incident upon the turning film by 20 degrees. For example, first light impinging on a turning film in a first incident direction is redirected to a first direction that has 20 degrees from the first incident direction and second light impinging on the turning film in a second incident direction is redirected to a second direction that has 20 degrees from the second incident direction. In some embodiments, the turning film is a thin film coating on surface 402-2 of waveguide 402. In some embodiments, the thin film coating includes a patterned film. In some embodiments, the thin film coating includes a patterned film including a plurality of nano- or micro-scaled prisms or other nano- or microstructures. In some embodiments, output coupler 1002-1 has a first index of refraction and waveguide 402 has a second index of refraction. In some embodiments, the second index of refraction is substantially the same as the first index of refraction.

In some embodiments, output coupler 1002-1 is a holographic film configured to redirect incident light based on an incident angle of the light impinging on the holographic film. For example, light impinging on output coupler 1002-1 in a first incident angle range is redirected to a first direction and light impinging on output coupler 1002-1 in a second incident angle range distinct from the first incident angle range is redirected to a second direction distinct from the first direction.

As shown in FIG. 10A, waveguide beam splitter 1000 is optically coupled with light source 502. Light 1004 output by light source 502 is transmitted through end surface 402-3 (e.g., an input surface) to enter waveguide 402. Output coupler 1002-1 is positioned to receive light 1004 propagating inside waveguide 402 at a first location. In some embodiments, output coupler 1002-1 redirects at least a first portion of light 1004 (e.g., portion 1006-1 of light 1004) in a first direction so that at least the first portion of light is output from waveguide beam splitter 1000 through surface 402-2 of waveguide 402 (e.g., an output surface of waveguide 402). In some embodiments, the first direction is non-parallel and non-perpendicular with reference plane 403 of waveguide 402. In some embodiments, the first direction of portion 1006-1 of light 1004 has an angle of refraction (e.g., angle B in FIG. 10A) greater than zero degrees, greater than 10 degrees, greater than 20 degrees, greater than 30 degrees, greater than 40 degrees, or greater than 50 degrees. A second portion of light 1004 (e.g., portion 1004-1 of light 1004) undergoes total internal reflection at surface 402-2 of waveguide 402 (e.g., when waveguide 402 and output coupler 1000-1 have a substantially same refractive index and output coupler is embedded inside waveguide 402) or at a surface of output coupler 1002-1 (e.g., when waveguide 402 and output coupler 1000-1 have different refractive indices) thereby continuing to propagate inside waveguide 402. Output coupler 1002-1 is positioned to receive portion 1004-1 of light 1004 propagating inside waveguide 402 at a second location. Output coupler 1002-1 redirects at least a third portion of the received light (e.g., portion 1006-2 of light 1004) in the first direction so that at least the third portion of light is output from waveguide beam splitter 1000 through surface 402-2 of waveguide 402. A fourth portion of the received light (e.g., portion 1004-2 of light 1004) undergoes total internal reflection at surface 402-2 or at a surface of output coupler 1002-1 thereby continuing to propagate inside waveguide 402.

In some embodiments, waveguide beam splitter 1000 is coupled with reflector assembly 626 described above with respect to FIG. 6B for recirculation of light propagating inside waveguide 402.

In FIG. 10B, waveguide beam splitter 1000 includes output coupler 1002-2 positioned adjacent to surface 402-1 instead of surface 402-2 of waveguide 402. For example, output coupler 1002-2 is a reflective holographic film or a reflective turning film. In FIG. 10B, output coupler 1002-2 is configured to redirect at least a first portion of light 1004 (e.g., portion 1006-1 of light 1004) incident upon output coupler 1002-2 at a first location in a first direction. In some embodiments, the first direction of portion 1006-1 of light 1004 has an angle of reflection (e.g., angle C in FIG. 10B) greater than zero degrees, greater than 10 degrees, greater than 20 degrees, greater than 30 degrees, greater than 40 degrees, or greater than 50 degrees. The first portion of light is reflected toward surface 402-2 to exit waveguide 402 through surface 402-2. A second portion of the light incident upon output coupler 1002-2 at the second location (e.g., portion 1004-1 of light 1004) continues to propagate inside waveguide 402 via total internal reflection.

Figure 10C:
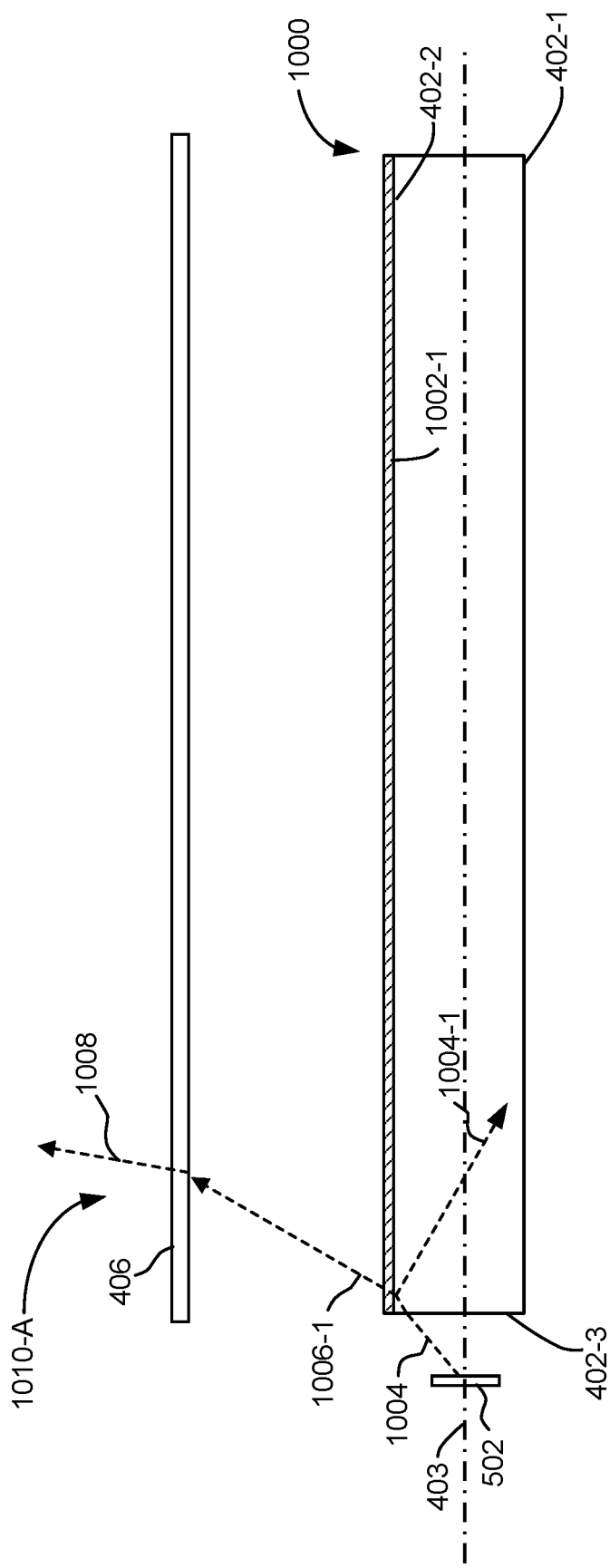
FIGS. 10C and 10D are schematic diagrams illustrating an optical device for providing illumination light in accordance with some embodiments.
Figure 10D:
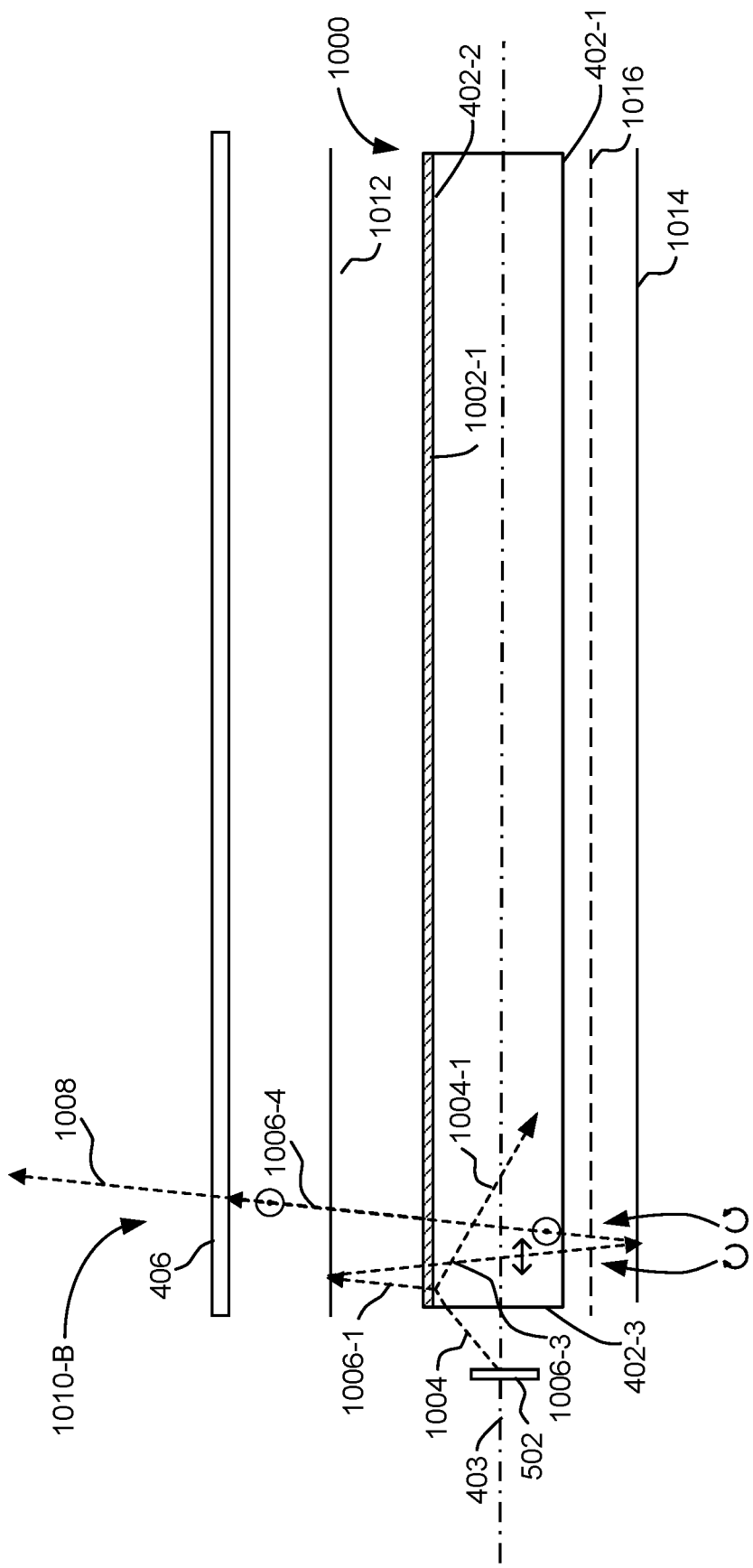

FIGS. 10C and 10D are schematic diagrams illustrating display device 1010 in accordance with some embodiments. Display device 1010-A in FIG. 10C is similar to display device 800 described above with respect to FIG. 8 except that display device 1010 includes waveguide beam splitter 1000. In some embodiments, light source 502 is positioned so that an optical axis of light source 502 corresponds to reference plane 403 of waveguide 402. Light source 502 is optically coupled with waveguide beam splitter 1000 so that light 1004 (e.g., illumination light) projected by light source 502 is received by end surface 402-3 of waveguide 402. In some embodiments, display device 1010 includes a light guide positioned between light source 502 and surface 402-3 of waveguide 402. In some embodiments, the light guide is tapered light guide 504 described with respect to FIG. 5A or compound parabolic concentrator 616 described with respect to FIG. 6A.

In some embodiments, spatial light modulator 406 (e.g., a transmission spatial light modulator) is positioned parallel to reference plane 403 of waveguide 402 and facing surface 402-2 of waveguide 402 (e.g., an output surface). Spatial light modulator 406 is configured to receive light (e.g., illumination light) from output coupler 1002-1. As shown in FIG. 10C, in some embodiments, spatial light modulator 406 receives light from output coupler 1002-1 directly. For example, portion 1006-1 of light 1004 redirected by output coupler 1002-1 to exit waveguide beam splitter 1000 is received at a first location of spatial light modulator 406. Spatial light modulator 406 is configured to modulate an amplitude or phase of at least a portion of illumination light (e.g., portion 1006-1 of light 1004) and output modulated light (e.g., image light 1008). In some embodiments, spatial light modulator 406 is a reflective spatial light modulator (e.g., an LCoS) as described above with respect to FIG. 4.

In such embodiments, image light 1008 is reflected back toward waveguide beam splitter 1000.

In FIG. 10D, display device 1010-B further includes reflective polarizer 1012, reflector 1014 (e.g., a mirror) and an optional retarder plate (e.g., retarder plate 1016). Display device 1010-B can provide light having a particular polarization to spatial light modulator 406 even when output coupler 1002-1 is polarization insensitive or polarization independent. Reflective polarizer 1012 and reflector 1014 are positioned on opposite sides of waveguide 402. In FIG. 10D, reflective polarizer 1012 is positioned between surface 402-2 of waveguide 402 and spatial light modulator 406 and reflector 1014 is positioned facing surface 402-1 of waveguide 402. In some embodiments, reflective polarizer 1012 and reflector 1014 are positioned parallel to reference plane 403 of waveguide 402.

Reflective polarizer 1012 is configured to reflect light having a first polarization while transmitting light having a polarization distinct from (e.g., orthogonal to) the first polarization. In some embodiments, reflective polarizer 1012 reflects light having a first linear polarization and transmits light having a polarization distinct from (e.g., orthogonal to) the first linear polarization. In some embodiments, reflective polarizer 1012 reflects light having a first circular polarization while transmitting light having a polarization distinct from (e.g., orthogonal to) the first circular polarization. For example, reflective polarizer 1012 is a cholesteric liquid crystal (CLC) polarization selective element or a polarization volume hologram (PVH) described above with respect to FIGS. 7A-7D.

As shown in FIG. 10D, reflective polarizer 1012 receives portion 1006-1 of light 1004 from waveguide beam splitter 1000. When portion 1006-1 of light 1004 has a first polarization (e.g., a first linear polarization) and reflective polarizer 1012 is configured to reflect light having the first polarization, reflective polarizer 1012 reflects portion 1006-1 of light 1004 as light 1006-3. Light 1006-3 propagates through waveguide beam splitter 1000 and retarder plate 1016 toward reflector 1014. Retarder plate 1016 is configured to convert light having a linear polarization to light having a circular polarization, and vice versa. For example, retarder plate 1016 converts polarization of light 1006-3 from the first linear polarization to a first circular polarization.

Reflector 1014 is positioned to receive light 1006-3 and reflect light 1006-3 as light 1006-4 while changing its polarization from the first circular polarization to a second circular polarization orthogonal to the first circular polarization. Retarder plate 1016 transmits light 1006-4 while converting its polarization from the second circular polarization to a second linear polarization that is orthogonal to the first linear polarization. Light 1006-4 having the second linear polarization, transmitted through waveguide beam splitter 1000, is received and transmitted by reflective polarizer 1012 toward spatial light modulator 406. Spatial light modulator 406 is positioned to receive light 1006-4 and output modulated light (e.g., image light 1008). As described above with respect to FIG. 10A, a portion of light 1004 (e.g., portion 1004-1 of light 1004) undergoes total internal reflection at surface 402-2 or a surface or output coupler 1002-1 thereby continuing to propagate inside waveguide 402. In some embodiments, retarder plate 1016 may be omitted where light 1006-3 is circularly polarized.

Figure 11A:
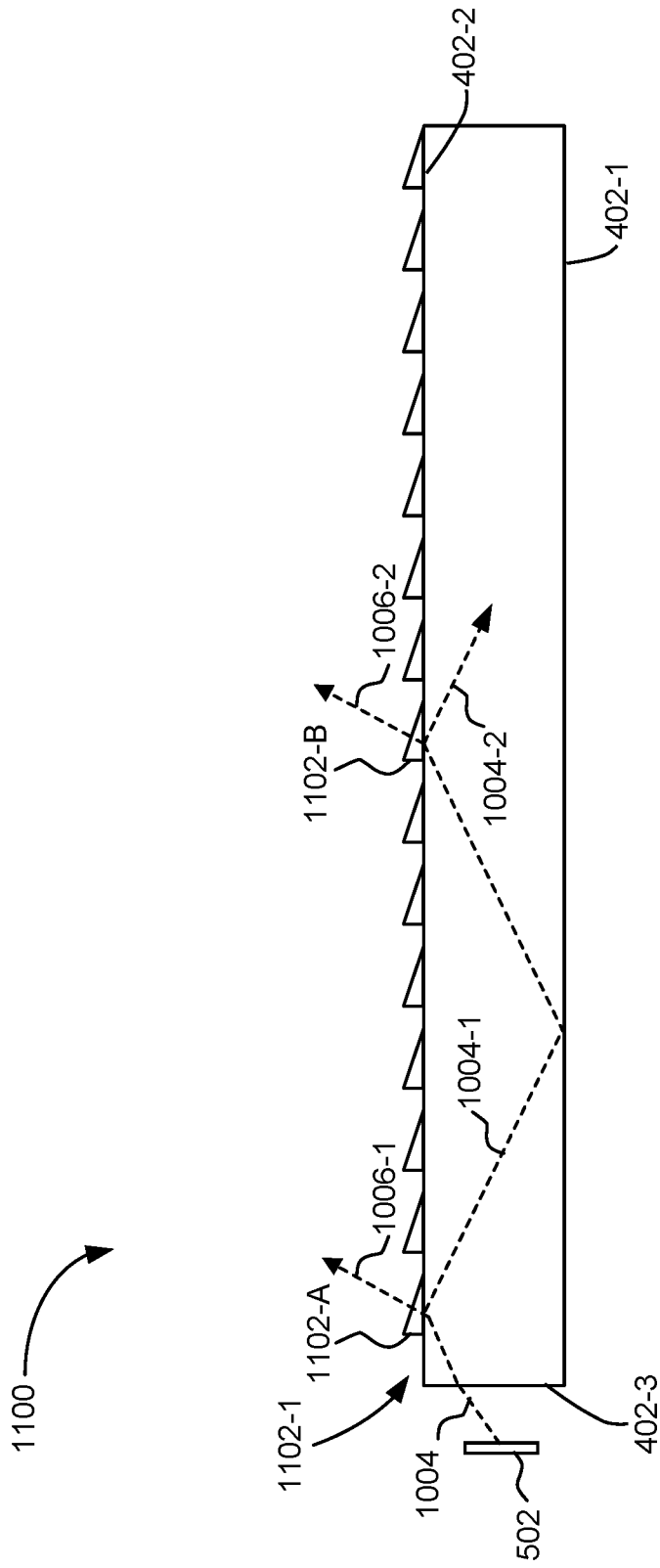
FIG. 11A is a schematic diagram illustrating an optical device for providing illumination light in accordance with some embodiments.
Figure 11B:
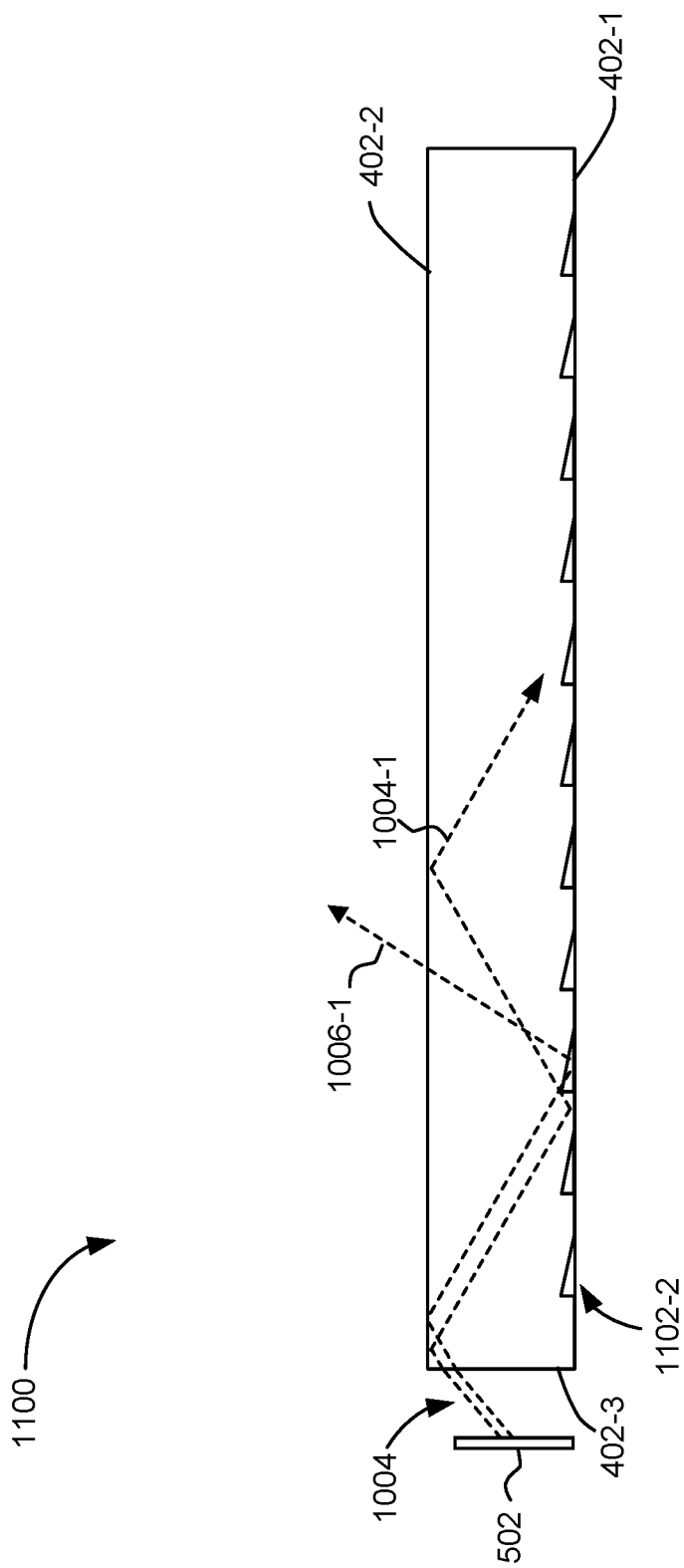
FIG. 11B is a schematic diagram illustrating an optical device for providing illumination light in accordance with some embodiments.

FIGS. 11A and 11B are schematic diagrams illustrating waveguide beam splitter 1100 in accordance with some embodiments. Waveguide beam splitter 1100 is similar to waveguide beam splitter 1000 described above with respect to FIG. 10A, except that waveguide beam splitter 1100 includes output coupler 1102-1. Output coupler 1102-1 includes a plurality of optical elements, such as prisms or Fresnel structures (e.g., prisms 1102-A and 1102-B). In FIG. 11A, output coupler 1102-1 is coupled with surface 402-2 of waveguide 402. Output coupler 1102-1 is configured to redirect portions of light 1004 (e.g., illumination light) to a first direction so that the portions of light are output from surface 402-2 of waveguide 402. For example, prism 1102-A outputs portion 1006-1 of light 1004 in the first direction while portion 1004-1 of light 1004 continues to propagate inside waveguide 402 via total internal reflection. Prism 1002-B outputs portion 1006-2 of light 1004 in the first direction while portion 1004-2 of light 1004 continues to propagate inside waveguide 402 via total internal reflection.

In FIG. 11B, output coupler 1102-2 is coupled with surface 402-1 of waveguide 402. Output coupler 1102-2 is configured to redirect portions of light 1004 (e.g., illumination light) received from light source 502 in a first direction so that the portions of light are output from surface 402-2 of waveguide 402. For example, output coupler 1102-2 redirects portion 1006-1 of light 1004 in the first direction while portion 1004-1 of light 1004 continues to propagate inside waveguide 402 via total internal reflection. Portion 1006-1 of light 1004 is output from waveguide beam splitter 1100 through surface 402-2 of waveguide 402.

It is noted that FIGS. 4, 5A-5C, 6A-6D, 7A-7D, 8, 9A-9D, 10A-10D, and 11A-11B are described independently of one another. For example, a first direction described with respect to FIG. 4 is not necessarily a same direction as a first direction described with respect to FIG. 11A.

In light of these principles, we now turn to certain embodiments.

In accordance with some embodiments, an optical device for providing illumination light includes an optical waveguide and a plurality of reflective polarizers (e.g., waveguide beam splitter 400 includes waveguide 402 and reflective polarizers 404 in FIG. 4). The plurality of reflective polarizers include a first reflective polarizer (e.g., reflective polarizer 404-1) and a second reflective polarizer (e.g., reflective polarizer 404-2) that is separate from the first reflective polarizer. The first reflective polarizer and the second reflective polarizer are disposed inside the optical waveguide so that the first reflective polarizer receives light (e.g., light 410) propagating inside the optical waveguide, redirects a first portion of the light in a first direction (e.g., portion 412-1 of light 410), and transmits a second portion of the light (e.g., portion 410-1 of light 410) in a second direction non-parallel to the first direction. The first reflective polarizer and the second reflective polarizer are disposed inside the optical waveguide so that the second reflective polarizer receives the second portion of the light from the first reflective polarizer (e.g., reflective polarizer 404-1 receives portion 410-1 of light 410), redirects a third portion of the light (e.g., portion 412-2 of light 410) in the second direction, and transmits a fourth portion of the light (e.g., portion 410-2 of light 410). A ratio between the first portion and the second portion of the light has a first value (e.g., $V_1$ described above with respect to FIG. 4) and a ratio between the third portion and the fourth portion of the light has a second value (e.g., $V_2$ described above with respect to FIG. 4) distinct from the first value (e.g., the first reflective polarizer and the second reflective polarizer have different reflectivities).

In some embodiments, the plurality of reflective polarizers include Fresnel structures or Fresnel prisms. In some embodiments, the reflective polarizers are made by using birefringent polymers (e.g., stretched birefringent polymer stacks or liquid crystal polymers).

In some embodiments, the second reflective polarizer is parallel to the first reflective polarizer and the first reflective polarizer and the second reflective polarizer intersect a reference plane of the optical waveguide (e.g., reflective polarizers 404-1 and 404-2 are positioned parallel to each other and they intersect reference plane 403 of waveguide 402 in FIG. 4).

In some embodiments, the first reflective polarizer is positioned at a first distance from a light source and the second reflective polarizer is positioned at a second distance from the light source. The second distance is greater than the first distance (e.g., reflective polarizer 404-1 is positioned closer to light source 502 than reflective polarizer 404-2 in FIG. 5A).

In some embodiments, the first value is less than the second value. For example, respective reflective polarizers of the plurality of reflective polarizers have values corresponding to reflectivities ranging from ⅙ to 1, so that the first reflective polarizer receiving light from a light source has the lowest value. For example, the respective reflective polarizers have reflectivity values ⅙, ⅕, ¼, ⅓, ½, and/or 1 (which correspond to V values of 5, 4, 3, 2, 1, and 0).

In some embodiments, the optical device includes a first surface and an opposing second surface and the plurality of reflective polarizers is positioned between the first surface and the second surface (e.g., reflective polarizers 404 are positioned between surface 402-1 and surface 402-2 of waveguide 402 in FIG. 4). In some embodiments, a distance (e.g., distance D3 in FIG. 5A) between the first surface and the second surface of the optical waveguide (e.g., a depth of the optical waveguide in direction z) ranges from 0.3 to 1.0 mm. In some embodiments, the distance is 0.5 mm. In some embodiments, the spatial light modulator and the optical waveguide have a surface area (e.g., an x-y-area) ranging from 1 mm×1 mm to 10 mm×10 mm.

In some embodiments, the first reflective polarizer and the second reflective polarizer are positioned non-parallel and non-perpendicular to the first surface and the second surface of the optical waveguide (e.g., FIG. 4). In some embodiments, the first reflective polarizer and the second reflective polarizer are perpendicular to each other and they define an angle with respect to the first surface of the optical waveguide. In some embodiments, the angle is between 15 and 75 degrees, between 30 and 60 degrees, or between 40 and 50 degrees. In some embodiments, the angle is 45 degrees (e.g., angle A in FIG. 4).

In some embodiments, the optical device further includes a spatial light modulator positioned adjacent to the first surface (e.g., spatial light modulator 406 is positioned adjacent to surface 402-1 of waveguide 402 in FIG. 5A). The first portion of the light and the third portion of the light (e.g., portions 412-1 and 412-2 of light 410 in FIG. 5A) are transmitted through the first surface of the optical waveguide toward the spatial light modulator.

In some embodiments, a distance between the spatial light modulator and the first surface of the optical waveguide is at least 0.5 mm (e.g., distance D4 in FIG. 5B).

In some embodiments, the first portion of the light is received by a first region of the spatial light modulator and the third portion of the light is received by a second region distinct from the first region of the spatial light modulator (e.g., portion 412-1 of light 410 is received by region 406-1 of spatial light modulator 406 and portion 412-2 of light 410 is received by region 406-2 of spatial light modulator 406 in FIG. 5A).

In some embodiments, the first portion of the light has a first intensity when incident on the first region and the third portion of the light has a second intensity corresponding to the first intensity when incident on the second region. In some embodiments, the second intensity is (substantially) the same as the first intensity thereby providing (substantially) uniform illumination for the first region and the second region of the spatial light modulator.

In some embodiments, the light received by the first reflective polarizer and the second portion of the light received by the second reflective polarizer have a first polarization. The first reflective polarizer and the second reflective polarizer are configured to receive image light (e.g., image light 509 in FIG. 5A) from the spatial light modulator in a third direction that is opposite and parallel to the second direction. The first reflective polarizer and the second reflective polarizer are also configured to transmit at least a portion of the image light having a second polarization distinct from the first polarization toward the second surface of the optical waveguide. In some embodiments, the spatial light modulator is coupled with a retarder plate (e.g., compensator 524 such as a quarter-wave plate) configured to change polarization of the light incident on the spatial light modulator and change polarization of the image light incident on the first and second reflective polarizers such that the image light received by the first and second reflective polarizers has the second polarization.

In some embodiments, the first reflective polarizer and the second reflective polarizer are spaced apart from each other so that none of the image light from the spatial light modulator in the third direction transmitted through the first reflective polarizer is transmitted through the second reflective polarizer (e.g., reflective polarizers 404 are separate from each other such that they do not overlap with each other in a vertical direction in FIG. 4).

In some embodiments, the first polarization is a first linear polarization and the second polarization is a second linear polarization orthogonal to the first linear polarization.

In some embodiments, the optical device further includes a linear polarizer (e.g., linear polarizer 508 in FIG. 5A) disposed adjacent to the second surface of the optical waveguide. The linear polarizer is configured to receive the image light (e.g., image light 509) transmitted by the first reflective polarizer and the second reflective polarizer and transmit at least a portion of the image light having the second polarization.

In some embodiments, the optical device further includes a light guide (e.g., light guide 512 in FIG. 5B) positioned between the first surface of the optical waveguide and the spatial light modulator. The light guide is configured to receive a portion of the first portion of the light (e.g., portion 412-1A) and redirect the portion of the first portion of the light toward the spatial light modulator. For example, the light guide may have a thickness (e.g., thickness D4) of 1 mm.

In some embodiments, the optical device further includes a first retarder plate (e.g., retarder plate 522 in FIG. 5C) disposed inside the optical waveguide adjacent to the first surface. In some embodiments, the optical device also includes a second retarder plate (e.g., compensator 524) disposed between the optical waveguide and the spatial light modulator.

In some embodiments, the optical device further includes a light source (e.g., light source 502 in FIG. 5A) configured to output the light and a tapered waveguide (e.g., tapered light guide 504) positioned between the optical waveguide and the light source. The tapered waveguide is configured to receive the light output by the light source and steer the light into the optical waveguide. In some embodiments, the tapered optical guide is further configured to collimate the light. In some embodiments, the light source is a LED, sLED, VCSEL or a laser diode.

In some embodiments, the optical device further includes a light source configured to output the light and a compound parabolic concentrator (e.g., compound parabolic concentrator 616 in FIG. 6A) positioned between the optical waveguide and the light source. The compound parabolic concentrator is configured to receive the light output by the light source and steer the light into the optical waveguide.

In accordance with some embodiments, a method includes receiving light with a first reflective polarizer located within an optical waveguide (e.g., FIG. 5A). The method includes redirecting, with the first reflective polarizer, a first portion of the light and transmitting a second portion of the light. A ratio between the first portion and the second portion of light has a first value (e.g., value $V_1$). The method also includes receiving the second portion of the light with a second reflective polarizer located within the optical waveguide. The second reflective polarizer is distinct and separate from the first reflective polarizer. The method further includes redirecting, with the second reflective polarizer, a third portion of the light and transmitting a fourth portion of the light. A ratio between the third portion and the fourth portion of the light has a second value (e.g., value $V_2$) distinct from the first value.

In accordance with some embodiments, an optical device for providing illumination light includes an optical waveguide and a plurality of polarization selective elements (e.g., waveguide beam splitter 602 for illuminating spatial light modulator 406 includes waveguide 402 and polarization selective elements 604 in FIG. 6A). The plurality of polarization selective elements is disposed adjacent to the optical waveguide so that a respective polarization selective element receives light in a first direction (e.g., light 610), and redirects a first portion of the light in a second direction (e.g., portion 612-1 of light 610). A second portion (e.g., portion 610-1 of light 610), distinct from the first portion, of the light undergoes total internal reflection, thereby continuing to propagate inside the optical waveguide.

In some embodiments, the respective polarization selective element is a polarization volume grating (e.g., PVH grating 700 in FIGS. 7A-7D).

In some embodiments, the optical waveguide includes a first surface and an opposing second surface (e.g., surfaces 402-1 and 402-2 of waveguide 402 in FIG. 6A) and the optical device also includes a spatial light modulator (e.g., spatial light modulator 406) positioned adjacent to the first surface.

In some embodiments, the respective polarization selective element is a reflective grating positioned adjacent to the second surface of the optical waveguide (e.g., polarization selective elements 604 in FIG. 6A are reflective gratings). Redirecting the first portion of the light (e.g., portion 612-1 of light 610) in the second direction includes directing (e.g., diffracting or deflecting) the first portion of the light in the second direction (while maintaining its polarization) such that the first portion of the light exits the optical waveguide through the first surface (e.g., surface 402-1).

In some embodiments, the respective polarization selective element is a transmission grating positioned adjacent to the first surface of the optical waveguide and between the first surface of the optical waveguide and the spatial light modulator (e.g., polarization selective elements 644 in FIG. 6D are transmission gratings). In some embodiments, redirecting the first portion of the light (e.g., portion 646 of light 610) in the second direction includes transmitting the first portion of the light in the second direction while converting its polarization.

In some embodiments, the plurality of polarization selective elements includes a first polarization selective element and a second polarization selective element. The first polarization selective element receives first light and redirects a first portion of the first light in the second direction (e.g., polarization selective element 604-1 receives light 610 and redirects portion 612-1 of light 610 in FIG. 6A). A second portion of the first light (e.g., portion 610-1), distinct from the first portion of the first light, undergoes total internal reflection at the second surface of the optical waveguide thereby continuing to propagate inside the optical waveguide as second light. A ratio between the first portion and the second portion of the first light has a first value. The second polarization selective element receives the second light and redirects a first portion of the second light in the second direction (e.g., polarization selective element 604-4 receives portion 610-1 of light 610 and redirects portion 612-2 of light 610). A second portion of the second light (e.g., portion 610-2), distinct from the first portion of the second light, undergoes total internal reflection at the second surface of the optical waveguide thereby continuing to propagate inside the optical waveguide. A ratio between the first portion and the second portion of the second light has a second value distinct from the first value.

In some embodiments, the first polarization selective element has a first thickness, the second polarization selective element has a second thickness greater than the first thickness, and the second value is greater than the first value (e.g., FIG. 6A).

In some embodiments, the first polarization selective element has a first duty cycle and the second polarization selective element has a second duty cycle. The second duty cycle is greater than the first duty cycle and the second value is greater than the first value. In some embodiments, a duty cycle is inversely proportional to a distance between two helical structures having a same orientation.

In some embodiments, the plurality of polarization selective elements includes a third polarization selective element positioned so that the second polarization selective element is positioned between the first polarization selective element and the third polarization selective element (e.g., waveguide beam splitter 630 in FIG. 6C includes polarization selective elements 624 so that the second polarization selective element is positioned between the first polarization selective element and the third polarization selective element). The third polarization selective element receives the second portion of the second light as third light and redirects a first portion of the third light in the second direction. A second portion of the third light, distinct from the first portion of the third light, undergoes total internal reflection at the second surface of the optical waveguide thereby continuing to propagate inside the optical waveguide. A ratio between the first portion and the second portion of the third light has a third value. In some embodiments, the third value is distinct from the second value. In some embodiments, the third value is identical to the first value.

In some embodiments, the optical waveguide has a first end positioned to receive the light and a second end opposite to the first end (e.g., waveguide 402 in FIG. 6C has end surfaces 402-3 and 402-4). The optical device also includes a polarization-maintaining reflector assembly (e.g., reflector assembly 626) positioned adjacent to the second end and the second value is greater than the first value and the third value. In some embodiments, the polarization-maintaining reflector assembly includes one or more polarization volume holograms for reflecting circularly polarized light while maintaining its handedness. In some embodiments, the polarization-maintaining reflector assembly includes a combination of a reflector and a polarization retarder (e.g., a quarter-wave plate). In some embodiments, the third value corresponds to the first value.

In some embodiments, the first portion of the first light is received by a first region of the spatial light modulator (e.g., portion 612-1 of light 610 is received by region 406-1 of spatial light modulator 406 in FIG. 6A) and the first portion of the second light is received by a second region of the spatial light modulator distinct from the first region of the spatial light modulator (e.g., portion 612-2 of light 610 is received by region 406-4 of spatial light modulator 406).

In some embodiments, the first portion of the first light has a first intensity when incident on the first region and the first portion of the second light has a second intensity corresponding to the first intensity when incident on the second region.

In some embodiments, the second intensity is substantially same as the first intensity thereby providing substantially uniform illumination for the first region and the second region of the spatial light modulator.

In some embodiments, the respective polarization selective element is switchable between different states, including a first state and a second state distinct from the first state. The first state causes the respective polarization selective element to redirect the first portion of the light in the second direction (without changing its polarization). The second portion of the light undergoes total internal reflection, thereby continuing to propagate inside the optical waveguide. The second state causes the respective polarization selective element to transmit the received light including the first portion and the second portion of the light such that the received light undergoes total internal reflection, thereby continuing to propagate inside the optical waveguide.

In some embodiments, the first state causes the first portion of the light in the second direction to illuminate a respective region of the spatial light modulator and the second state causes the respective polarization selective element to forgo illuminating the respective region of the spatial light modulator.

In some embodiments, the optical device further includes a light source (e.g., light source 502 in FIG. 6A) positioned to provide the light into the optical waveguide toward the respective polarization selective element.

In some embodiments, the light source defines an optical axis that is parallel to an optical axis of the optical waveguide (e.g., FIG. 6A).

In some embodiments, the light source defines an optical axis that is tilted with respect to an optical axis of the optical waveguide (e.g., FIG. 6C).

In some embodiments, the optical device further includes a tapered light guide (e.g., tapered light guide 504 in FIG. 5A) positioned between the light source and the optical waveguide. The tapered light guide is configured to direct the light provided by the light source into the optical waveguide. In some embodiments, the optical device further includes a lens or a compound parabolic concentrator (e.g., compound parabolic concentrator 616 in FIG. 6A).

In some embodiments, the optical device further includes a diffuser positioned between the light source and the optical waveguide.

In accordance with some embodiments, a method for providing illumination light includes receiving light in a first direction with a respective polarization selective element of a plurality of polarization selective elements disposed adjacent to an optical waveguide (e.g., FIG. 6A). The method also includes redirecting, with the respective polarization selective element, a first portion of the light in a second direction. A second portion, distinct from the first portion, of the light undergoes total internal reflection, thereby continuing to propagate inside the optical waveguide.

In accordance with some embodiments, an optical device includes a spatial light modulator and an optical waveguide with a plurality of extraction features (e.g., display device 800 includes spatial light modulator 406, waveguide 402, and extraction features 804 in FIG. 8). The plurality of extraction features is positioned relative to the optical waveguide so that a respective extraction feature receives light (e.g., light 610), having propagated within the optical waveguide, in a first direction and directs a first portion of the light (e.g., portion 612-1 of light 610) in a second direction distinct from the first direction to exit the optical waveguide and illuminate at least a portion of the spatial light modulator (e.g., region 406-1 of spatial light modulator 406). The plurality of extraction features is also positioned relative to the optical waveguide so that a respective extraction feature directs a second portion (e.g., portion 610-1 of light 610), distinct from the first portion, of the light to undergo total internal reflection, thereby continuing to propagate within the optical waveguide.

In some embodiments, the respective extraction feature is selected from a group consisting of a surface relief grating, a holographic optical element, a volume Bragg grating, or a Fresnel prism (e.g., FIGS. 9A-9D).

In some embodiments, the plurality of extraction features is embedded inside the optical waveguide (e.g., FIG. 8). In some embodiments, the plurality of extraction features is disposed between a first surface and a second surface of the optical waveguide.

In some embodiments, the plurality of extraction features is disposed adjacent to a surface of the optical waveguide (e.g., surface 402-1 or surface 402-2 of waveguide 402 in FIG. 8). In some embodiments, the plurality of extraction features is in direct contact with the surface of the optical waveguide.

In some embodiments, the plurality of extraction features defines a plane that is parallel to a surface of the optical waveguide (e.g., extraction features 804 define a plane that is parallel to surfaces 402-1 and 402-2 of waveguide 402 in FIG. 8).

In some embodiments, the plurality of extraction features includes a first extraction feature and a second extraction feature (e.g., extraction features 804 in FIG. 8). The first extraction feature receives first light, directs a first portion of the first light in the second direction to exit the optical waveguide, and directs a second portion of the first light to undergo total internal thereby continuing to propagate within the optical waveguide as second light (e.g., as shown in 8). A ratio between the first portion and the second portion of the first light has a first value. The second extraction feature receives the second light, directs a first portion of the second light in the second direction to exit the optical waveguide, and directs a second portion of the second light to undergo total internal reflection, thereby continuing to propagate within the optical waveguide (e.g., as shown in FIG. 6A). A ratio between the first portion and the second portion of the second light has a second value distinct from the first value.

In some embodiments, the plurality of extraction features includes a third extraction feature positioned so that the second extraction feature is positioned between the first extraction feature and the third extraction feature. The third extraction feature receives the second portion of the second light as third light, directs a first portion of the third light in the second direction to exit the optical waveguide, and directs a second portion of the third light to undergo total internal reflection at the second surface of the optical waveguide thereby continuing to propagate within the optical waveguide. A ratio between the first portion and the second portion of the third light has a third value distinct from the second value.

In some embodiments, the third value corresponds to the first value, and the second value is greater than the first value and the third value.

In some embodiments, the first portion of the first light is received by a first region of the spatial light modulator and the first portion of the second light is received by a second region distinct from the first region of the spatial light modulator waveguide (e.g., as shown in FIG. 6A).

In some embodiments, the first portion of the first light has a first intensity when incident on the first region, the first portion of the second light has a second intensity when incident on the second region, and the second intensity corresponds to the first intensity.

In some embodiments, the first extraction feature and the second extraction feature are configured to receive image light from the spatial light modulator in a third direction opposite and parallel to the second direction and transmit at least a portion of the image light (e.g., image light 614-1 in FIG. 8).

In some embodiments, the optical waveguide includes a first surface and an opposing second surface (e.g., surfaces 402-1 and 402-2 of waveguide 402 in FIG. 8). The spatial light modulator (e.g., spatial light modulator 406) is optically coupled with (e.g., adjacent to) the first surface. The optical device also includes a polarizer (e.g., polarizer 506) disposed adjacent to the second surface of the optical waveguide. The polarizer is configured to receive the image light (e.g., image light 614-1) transmitted through the optical waveguide and transmit at least a portion of the image light (e.g., portion 814-1 of image light 614-1 from spatial light modulator 406), where the transmitted portion has a particular polarization.

In some embodiments, the respective extraction feature is a switchable grating (e.g., VBG extraction feature 910 described with respect to FIG. 9B may be switchable). The switchable grating is switchable between different states, including a first state and a second state distinct from the first state. The first state causes the respective extraction feature to direct the first portion of the light in the second direction to exit the optical waveguide and direct the second portion of the light to undergo total internal reflection, thereby continuing to propagate within the optical waveguide. The second state causes the respective extraction feature to transmit the received light, including the first portion and the second portion of the light, such that substantially all of the received light undergoes total internal reflection, thereby continuing to propagate within the optical waveguide.

In some embodiments, the first state causes the first portion of the light to illuminate a respective region of the spatial light modulator and the second state causes the respective extraction feature to forgo illuminating the respective region of the spatial light modulator.

In some embodiments, the respective extraction feature is polarization selective. For example, the respective extraction feature is configured to redirect light having a first polarization and transmit light having a second polarization distinct from the first polarization. For example, HOE extraction feature 900 described with respect to FIG. 9A may be polarization selective.

In some embodiments, the optical device further includes a first retarder plate disposed inside the optical waveguide (e.g., retarder plate 806 in FIG. 8).

In accordance with some embodiments, a head-mounted display device (e.g., display device 100 in FIG. 1) includes the optical device described above.

In accordance with some embodiments, a method includes receiving first light with a first extraction feature of the plurality of extraction features and directing a first portion of the first light in the second direction to exit the optical waveguide (e.g., FIGS. 6A and 8). The method includes directing a second portion of the first light to undergo total internal thereby continuing to propagate within the optical waveguide as second light. A ratio between the first portion and the second portion of the first light has a first value. The method includes receiving the second light with a second extraction feature of the plurality of extraction features and directing a first portion of the second light in the second direction to exit the optical waveguide. The method also includes directing a second portion of the second light to undergo total internal reflection, thereby continuing to propagate within the optical waveguide. A ratio between the first portion and the second portion of the second light has a second value distinct from the first value.

In some embodiments, the respective extraction feature is selected from a group consisting of a surface relief grating, a holographic optical element, a volume Bragg grating, or a Fresnel prism (e.g., FIG. 9A-9D).

In accordance with some embodiments, a method includes receiving first light with a first extraction feature of the plurality of extraction features and directing a first portion of the first light in the second direction to exit the optical waveguide (e.g., FIGS. 6A and 8). The method also includes directing a second portion of the first light to undergo total internal thereby continuing to propagate within the optical waveguide as second light. A ratio between the first portion and the second portion of the first light has a first value. The method further includes receiving the second light with a second extraction feature of the plurality of extraction features, directing a first portion of the second light in the second direction to exit the optical waveguide, and directing a second portion of the second light to undergo total internal reflection, thereby continuing to propagate within the optical waveguide. A ratio between the first portion and the second portion of the second light has a second value distinct from the first value.

In accordance with some embodiments, an optical device includes a light source configured to provide illumination light and a waveguide (e.g., display device 1010 includes light source 502 and waveguide 402 in FIG. 10C). The waveguide has an input surface (e.g., end surface 402-3), an output surface (e.g., surface 402-2) distinct from and non-parallel to the input surface, and an output coupler (e.g., output coupler 1002-1). The waveguide is configured to receive, at the input surface, the illumination light (e.g., light 1004) provided by the light source and propagate the illumination light via total internal reflection. The waveguide is also configured to redirect, by the output coupler, the illumination light (e.g., portion 1006-1 and portion 1006-2 of light 1004) so that the illumination light is output from the output surface for illuminating a spatial light modulator (e.g., spatial light modulator 406).

In some embodiments, the optical device further includes the spatial light modulator positioned to receive the illumination light output from the output surface of the waveguide (e.g., spatial light modulator 406 is positioned to receive lights 1006-4 and 1006-5 from waveguide 402 in FIG. 10C), modulate an amplitude or phase of at least a portion of the illumination light, and output modulated light (e.g., image light 1008).

In some embodiments, the optical device further includes a reflective polarizer (reflective polarizer 1012 in FIG. 10D), a reflector (e.g., reflector 1014) and an optical retarder (e.g., retarder plate 1016) disposed between the reflective polarizer and the reflector. The reflective polarizer is disposed on a first side of the waveguide and configured to transmit light (e.g., light 1006-4) having a first polarization and reflect light (e.g., portion 1006-1 of light) having a second polarization different from (e.g., orthogonal to) the first polarization. The reflector is disposed on a second side of the waveguide that is opposite to the first side of the waveguide. The reflector is positioned to receive the light reflected by the reflective polarizer (e.g., light 1006-3) and reflect the received light back toward the reflective polarizer (e.g., as light 1006-4). In some embodiments, optical retarder is configured to transmit light while changing a polarization of the light. In some embodiments, the optical retarder is disposed between the reflective polarizer and the waveguide. In some embodiments, the optical retarder is disposed between the reflector and the waveguide. In some embodiments, the reflective polarizer is positioned between the spatial light modulator and the waveguide.

In some embodiments, the output coupler is disposed adjacent to the output surface (e.g., output coupler 1002-1 is disposed adjacent to surface 402-2 in FIG. 10C).

In some embodiments, the output coupler includes a turning film (also known as a direction turning film or a light turning film) configured to redirect the illumination light propagating in the waveguide so that at least a portion of the illumination light is output from the output surface of the waveguide in a first direction (e.g., output coupler 1002-1 is a turning film in FIG. 10C). In some embodiments, the turning film is a coating disposed on the output surface.

In some embodiments, the output coupler is a holographic film that is configured to redirect light in a direction based on an angle of incidence of the light upon the holographic film. The illumination light is incident upon the holographic film at a first range of incident angles.

In some embodiments, the turning film has a first refractive index and the waveguide has a second refractive index that is substantially same as the first refractive index.

In some embodiments, the first direction (e.g., direction of light portion 1006-1 of light 1004 in FIG. 10A) is non-parallel and non-perpendicular with a reference plane defined by the waveguide (e.g., the direction portion 1006-1 of light 1004 defines angle A with respect to a normal to reference plane 403 of waveguide 402).

In some embodiments, the optical device further includes a tapered waveguide positioned between the waveguide and the light source (e.g., tapered light guide 504 in FIG. 5A). The tapered waveguide is configured to receive the illumination light provided by the light source and steer the illumination light into the waveguide. In some embodiments, the tapered optical guide is further configured to collimate the light.

In some embodiments, the output coupler includes a plurality of optical elements (e.g., output coupler 1102-1 includes a plurality of prisms, such as prisms 1102-A and 1102-B, in FIG. 11A). The plurality of optical elements is coupled to the output surface of the waveguide (e.g., surface 402-2). The plurality of optical elements is configured to redirect the illumination light so that the illumination light is output from the output surface of the waveguide (e.g., portion 1006-1 of light 1004 is output from surface 402-2).

In some embodiments, the waveguide includes an optical surface (e.g., surface 402-1 in FIG. 11B) opposite to the output surface and distinct from the input surface and the output surface. The output coupler includes a plurality of optical elements. The plurality of optical elements is coupled to the optical surface of the waveguide (e.g., output coupler 1102-2 is coupled with surface 402-1 in FIG. 11B). The plurality of optical elements is configured to redirect the illumination light so that the illumination light is output from the output surface of the waveguide (e.g., portion 1006-1 of light 1004 is output from surface 402-2).

In accordance with some embodiments, a method of providing illumination light includes providing, from a light source, illumination light and receiving, at an input surface of a waveguide, the illumination light provided by the light source (e.g., FIG. 10C). The waveguide also includes an output surface that is distinct from and non-parallel to the input surface and an output coupler. The method also includes, propagating, in the waveguide, the illumination light via total internal reflection and redirecting, by the output coupler, the illumination light so that the illumination light is output from the output surface of the waveguide for illuminating a spatial light modulator.

In some embodiments, the method includes receiving, at the spatial light modulator (e.g., spatial light modulator 406 in FIG. 10C), the illumination light output from the output surface of the waveguide and modulating, at the spatial light modulator, an amplitude or phase of at least a portion of the illumination light. The method also includes outputting modulated light from the spatial light modulator.

In some embodiments, the method includes transmitting, with a reflective polarizer (e.g., reflective polarizer 1012 in FIG. 10D) disposed on a first side of the waveguide, light having a first polarization and reflect light having a second polarization different from the first polarization. The method includes receiving, with a reflector (e.g., reflector 1014) disposed on a second side of the waveguide that is opposite to the first side of the waveguide, the light reflected by the reflective polarizer. The method also includes reflecting the received light toward the reflective polarizer. An optical retarder (e.g., retarder plate 1016) is disposed between the reflective polarizer and the reflector.

In some embodiments, the output coupler is disposed adjacent to the output surface of the waveguide (e.g., FIG. 10C).

In some embodiments, the output coupler is a turning film. The method further includes redirecting, by the turning film, the illumination light propagating in the waveguide so that at least a portion of the illumination light is output from the output surface of the waveguide in a first direction (e.g., FIG. 10C).

In some embodiments, the output coupler is a holographic film configured to redirect light in a direction based on an angle of incidence of the light incident upon the holographic film (e.g., FIG. 10C). The illumination light is incident upon the holographic film at a first range of incident angles. The method further includes redirecting, by the holographic film, the illumination light in the first direction based on the first range of incident angles.

In some embodiments, the method includes receiving, by a tapered waveguide positioned between the waveguide and the light source, the illumination light provided by the light source and steering the illumination light into the waveguide (e.g., FIG. 5A).

In some embodiments, the output coupler includes a plurality of optical elements (e.g., output coupler 1102-1 in FIG. 11A). The plurality of optical elements is coupled to the output surface of the waveguide. The method further includes redirecting, by the plurality of optical elements, the illumination light so that the illumination light is output from the output surface of the waveguide.

In some embodiments, the output coupler includes a plurality of optical elements. The plurality of optical elements is coupled to an optical surface opposite to, and distinct from, the output surface of the waveguide (e.g., output coupler 1102-2 in FIG. 11B). The method further includes redirecting, by the plurality of optical elements, the illumination light so that the illumination light is output from the output surface of the waveguide.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
   a spatial light modulator; and
   an optical waveguide with a plurality of extraction features positioned relative to the optical waveguide so that a respective extraction feature:
   receives light, having propagated within the optical waveguide, in a first direction; and
   directs a first portion of the light in a second direction distinct from the first direction to exit the optical waveguide and illuminate at least a portion of the spatial light modulator and direct a second portion, distinct from the first portion, of the light to undergo total internal reflection, thereby continuing to propagate within the optical waveguide.

2. The optical device of claim 1, wherein:
the respective extraction feature is selected from a group consisting of a surface relief grating, a holographic optical element, a volume Bragg grating, or a Fresnel prism.

3. The optical device of claim 1, wherein:
the plurality of extraction features is embedded inside the optical waveguide.

4. The optical device of claim 1, wherein:
the plurality of extraction features is disposed adjacent to a surface of the optical waveguide.

5. The optical device of claim 1, wherein:
the plurality of extraction features defines a plane that is parallel to a surface of the optical waveguide.

6. The optical device of claim 1, wherein:
the plurality of extraction features includes a first extraction feature and a second extraction feature;
the first extraction feature receives first light, directs a first portion of the first light in the second direction to exit the optical waveguide, and directs a second portion of the first light to undergo total internal thereby continuing to propagate within the optical waveguide as second light, wherein a ratio between the first portion and the second portion of the first light has a first value; and
the second extraction feature receives the second light, directs a first portion of the second light in the second direction to exit the optical waveguide, and directs a second portion of the second light to undergo total internal reflection, thereby continuing to propagate within the optical waveguide, wherein a ratio between the first portion and the second portion of the second light has a second value distinct from the first value.

7. The optical device of claim 6, wherein:
the plurality of extraction features includes a third extraction feature positioned so that the second extraction feature is positioned between the first extraction feature and the third extraction feature; and
the third extraction feature receives the second portion of the second light as third light, directs a first portion of the third light in the second direction to exit the optical waveguide, and directs a second portion of the third light to undergo total internal reflection, thereby continuing to propagate within the optical waveguide, wherein a ratio between the first portion and the second portion of the third light has a third value distinct from the second value.

8. The optical device of claim 7, wherein:
the third value corresponds to the first value, and the second value is greater than the first value and the third value.

9. The optical device of claim 6, wherein the first portion of the first light is received by a first region of the spatial light modulator and the first portion of the second light is received by a second region distinct from the first region of the spatial light modulator.

10. The optical device of claim 9, wherein the first portion of the first light has a first intensity when incident on the first region, the first portion of the second light has a second intensity when incident on the second region, and the second intensity corresponds to the first intensity.

11. The optical device of claim 9, wherein:
the first extraction feature and the second extraction feature are configured to receive image light from the spatial light modulator in a third direction and transmit at least a portion of the image light.

12. The optical device of claim 11, wherein:
the optical waveguide includes a first surface and an opposing second surface;
the spatial light modulator is optically coupled with the first surface; and
the optical device also includes a polarizer disposed adjacent to the second surface of the optical waveguide, the polarizer configured to:
receive the image light transmitted through the optical waveguide; and
transmit at least a portion of the image light, the transmitted portion having a particular polarization.

13. The optical device of claim 6, wherein:
the respective extraction feature is a switchable grating that is switchable between different states, including a first state and a second state distinct from the first state;
the first state causes the respective extraction feature to direct the first portion of the light in the second direction to exit the optical waveguide and direct the second portion of the light to undergo total internal reflection, thereby continuing to propagate within the optical waveguide; and
the second state causes the respective extraction feature to transmit the received light such that the received light undergoes total internal reflection, thereby continuing to propagate within the optical waveguide.

14. The optical device of claim 13, wherein:
the first state causes the first portion of the light to illuminate a respective region of the spatial light modulator; and
the second state causes the respective extraction feature to forgo illuminating the respective region of the spatial light modulator.

15. The optical device of claim 1, wherein:
the respective extraction feature is polarization selective.

16. The optical device of claim 1, further including a first retarder plate disposed inside the optical waveguide.

17. A head-mounted display device comprising the optical device of claim 1.

18. A method for providing illumination light, the method comprising:
receiving light, having propagated within an optical waveguide, in a first direction with a respective extraction feature of a plurality of extraction features optically coupled with the optical waveguide;
directing, with the respective extraction feature, a first portion of the light in a second direction to exit the optical waveguide and directing a second portion, distinct from the first portion, of the light to undergo total internal reflection, thereby continuing to propagate within the optical waveguide; and
illuminating at least a portion of a spatial light modulator with the first portion of the light.

19. The method of claim 18, wherein:
the respective extraction feature is selected from a group consisting of a surface relief grating, a holographic optical element, a volume Bragg grating, or a Fresnel prism.

20. The method of claim 18, further including:
receiving first light with a first extraction feature of the plurality of extraction features, directing a first portion of the first light in the second direction to exit the optical waveguide, and directing a second portion of the first light to undergo total internal thereby continuing to propagate within the optical waveguide as second light, wherein a ratio between the first portion and the second portion of the first light has a first value; and receiving the second light with a second extraction feature of the plurality of extraction features, directing a first portion of the second light in the second direction to exit the optical waveguide, and directing a second portion of the second light to undergo total internal reflection, thereby continuing to propagate within the optical waveguide, wherein a ratio between the first portion and the second portion of the second light has a second value distinct from the first value.

* * * * *